(12) United States Patent
Akiyama

(10) Patent No.: US 12,052,052 B2
(45) Date of Patent: Jul. 30, 2024

(54) OPTICAL DEMULTIPLEXER AND COMMUNICATION DEVICE

(71) Applicant: FUJITSU LIMITED, Kawasaki (JP)

(72) Inventor: Tomoyuki Akiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 265 days.

(21) Appl. No.: 17/730,597

(22) Filed: Apr. 27, 2022

(65) Prior Publication Data

US 2022/0416886 A1    Dec. 29, 2022

(30) Foreign Application Priority Data

Jun. 28, 2021 (JP) ................................ 2021-106538

(51) Int. Cl.
*H04J 14/02*    (2006.01)
*H04B 10/079*   (2013.01)

(52) U.S. Cl.
CPC .... *H04B 10/07955* (2013.01); *H04J 14/0227* (2013.01)

(58) Field of Classification Search
CPC .............. G02B 6/29355; G02B 6/2938; G02B 6/12004; G02B 6/29386; H04B 10/07955; H04J 14/0227; H04J 14/02

See application file for complete search history.

(56) References Cited

U.S. PATENT DOCUMENTS

| | | | | |
|---|---|---|---|---|
| 5,852,505 A * | 12/1998 | Li | ......................... | G02B 6/2938 398/58 |
| 6,263,126 B1 * | 7/2001 | Cao | ..................... | G02B 6/29349 385/24 |
| 6,349,158 B1 * | 2/2002 | Yang | ................... | G02B 6/29355 385/24 |
| 6,804,430 B2 * | 10/2004 | Ooyama | ............ | G02B 6/29352 385/27 |

(Continued)

FOREIGN PATENT DOCUMENTS

JP    2019-135524 A    8/2019

*Primary Examiner* — Tanya T Motsinger

(74) *Attorney, Agent, or Firm* — STAAS & HALSEY LLP

(57) ABSTRACT

An optical demultiplexer includes a first optical-processing-circuit to include first to third AMZs, each including a pair-of-arms of different lengths, the first AMZ outputting, to the second AMZ, a first signal-light-component and a first local-oscillation-light with center wavelengths adjacent to each other among a plurality of signal-light-components and a plurality of local-oscillation-lights inputted to the pair-of-arms, and outputting, to the third AMZ, a second signal-light-component with a same center wavelength as the first local-oscillation-light and a second local-oscillation-light with the same center wavelength as the first signal-light-component, the second AMZ outputting the first signal-light-component and the first local-oscillation-light, which are inputted to the pair-of-arms from the first AMZ, to a second optical-processing-circuit and a third optical-pro- (Continued)

cessing-circuit, respectively, and the third AMZ outputting the second local-oscillation-light and the second signal-light-component, which are inputted to the pair-of-arms from the first AMZ, to the second optical-processing-circuit and the third optical-processing-circuit, respectively.

19 Claims, 21 Drawing Sheets

(56) References Cited

U.S. PATENT DOCUMENTS

| | | | | |
|---|---|---|---|---|
| 6,909,531 | B2 * | 6/2005 | Frignac | G02B 6/29386 |
| | | | | 398/43 |
| 6,947,631 | B2 * | 9/2005 | Arai | G02B 6/29355 |
| | | | | 398/79 |
| 7,596,322 | B2 * | 9/2009 | Tomaru | H04L 9/0858 |
| | | | | 380/255 |
| 8,886,057 | B2 * | 11/2014 | Hironishi | H04B 10/6165 |
| | | | | 398/208 |
| 9,547,132 | B2 * | 1/2017 | Jeong | G02B 6/2938 |
| 11,119,278 | B2 * | 9/2021 | Akiyama | G02B 6/29395 |
| 2001/0024543 | A1 * | 9/2001 | Ahmadvand | G02B 6/2938 |
| | | | | 385/24 |
| 2001/0048786 | A1 * | 12/2001 | Arai | G02B 6/12007 |
| | | | | 385/24 |
| 2002/0106147 | A1 * | 8/2002 | Kitoh | G02B 6/12007 |
| | | | | 385/24 |
| 2004/0086220 | A1 * | 5/2004 | Mino | G02F 1/3132 |
| | | | | 385/22 |
| 2004/0120640 | A1 * | 6/2004 | Hatayama | H04B 10/2941 |
| | | | | 385/27 |
| 2004/0136646 | A1 * | 7/2004 | Shahar | G02B 6/125 |
| | | | | 385/24 |
| 2005/0276539 | A1 * | 12/2005 | Fukuda | G02B 6/29385 |
| | | | | 385/24 |
| 2007/0104409 | A1 * | 5/2007 | Nara | G02B 6/2938 |
| | | | | 385/24 |
| 2009/0041243 | A1 * | 2/2009 | Nambu | H04L 9/0858 |
| | | | | 380/256 |
| 2009/0169211 | A1 * | 7/2009 | Chen | G02B 6/29355 |
| | | | | 398/79 |
| 2010/0080560 | A1 * | 4/2010 | Mertz | H04B 10/67 |
| | | | | 398/202 |
| 2013/0039662 | A1 | 2/2013 | Brooks et al. | |
| 2013/0177027 | A1 | 7/2013 | Rasras | |
| 2018/0069636 | A1 * | 3/2018 | Morra | H04B 10/677 |
| 2018/0219633 | A1 * | 8/2018 | Kanter | H04B 10/2575 |
| 2019/0245642 | A1 | 8/2019 | Akiyama | |

* cited by examiner

OPTICAL DEMULTIPLEXER AND COMMUNICATION DEVICE

CROSS-REFERENCE TO RELATED APPLICATION

This application is based upon and claims the benefit of priority of the prior Japanese Patent Application No. 2021-106538, filed on Jun. 28, 2021, the entire contents of which are incorporated herein by reference.

FIELD

The embodiments discussed herein are related to an optical demultiplexer and a communication device.

BACKGROUND

For example, an optical demultiplexer has been disclosed, in which asymmetric Mach-Zehnder Interferometers (AMZs) having a pair of arms that differ in length are coupled in multiple stages in a tree shape. This type of optical demultiplexer is used, for example, to demultiplex a signal light for each wavelength from a digitally and coherently transmitted wavelength multiplexing signal light in a receiver that receives the wavelength multiplexing signal light.

Japanese Laid-open Patent Publication No. 2019-135524 is disclosed as related art.

SUMMARY

According to an aspect of the embodiments, an optical demultiplexer includes a first optical processing circuit configured to receive multi-wavelength signal light including a plurality of signal light components and multi-wavelength local oscillation light including a plurality of local oscillation lights with same center wavelengths as the plurality of signal light components, respectively, a second optical processing circuit configured to demultiplex a signal light component and a local oscillation light inputted from the first optical processing circuit among the plurality of signal light components and the plurality of local oscillation lights, and a third optical processing circuit configured to demultiplex another signal light component and another local oscillation light inputted from the first optical processing circuit among the plurality of signal light components and the plurality of local oscillation lights, wherein the first optical processing circuit includes first to third asymmetric Mach-Zehnder interferometers, each including a pair of arms of different lengths, wherein the first asymmetric Mach-Zehnder interferometer outputs, to the second asymmetric Mach-Zehnder interferometer, a first signal light component and a first local oscillation light with center wavelengths adjacent to each other among the plurality of signal light components and the plurality of local oscillation lights inputted to the pair of arms, and outputs, to the third asymmetric Mach-Zehnder interferometer, a second signal light component with the same center wavelength as the first local oscillation light and a second local oscillation light with the same center wavelength as the first signal light component, wherein the second asymmetric Mach-Zehnder interferometer outputs the first signal light component and the first local oscillation light, which are inputted to the pair of arms from the first asymmetric Mach-Zehnder interferometer, to the second optical processing circuit and the third optical processing circuit, respectively, and wherein the third asymmetric Mach-Zehnder interferometer outputs the second local oscillation light and the second signal light component, which are inputted to the pair of arms from the first asymmetric Mach-Zehnder interferometer, to the second optical processing circuit and the third optical processing circuit, respectively.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In order to detect a plurality of signal lights demultiplexed by an optical demultiplexer, a receiver includes a local oscillation light source of multi-wavelength local oscillation light including a plurality of local oscillation lights having the same center wavelengths as the plurality of signal lights. Therefore, the receiver preferably has an optical demultiplexer that demultiplexes multi-wavelength local oscillation light into local oscillation lights for each wavelength, in addition to the optical demultiplexer for demultiplexing the signal light, thus resulting in increased device size. As a result, not only the power consumption increases, but also the intersections between waveguides of each optical demultiplexer on a substrate may increase, and crosstalk and power loss of the signal light may also increase, for example.

Comparative Example

Figure 1:
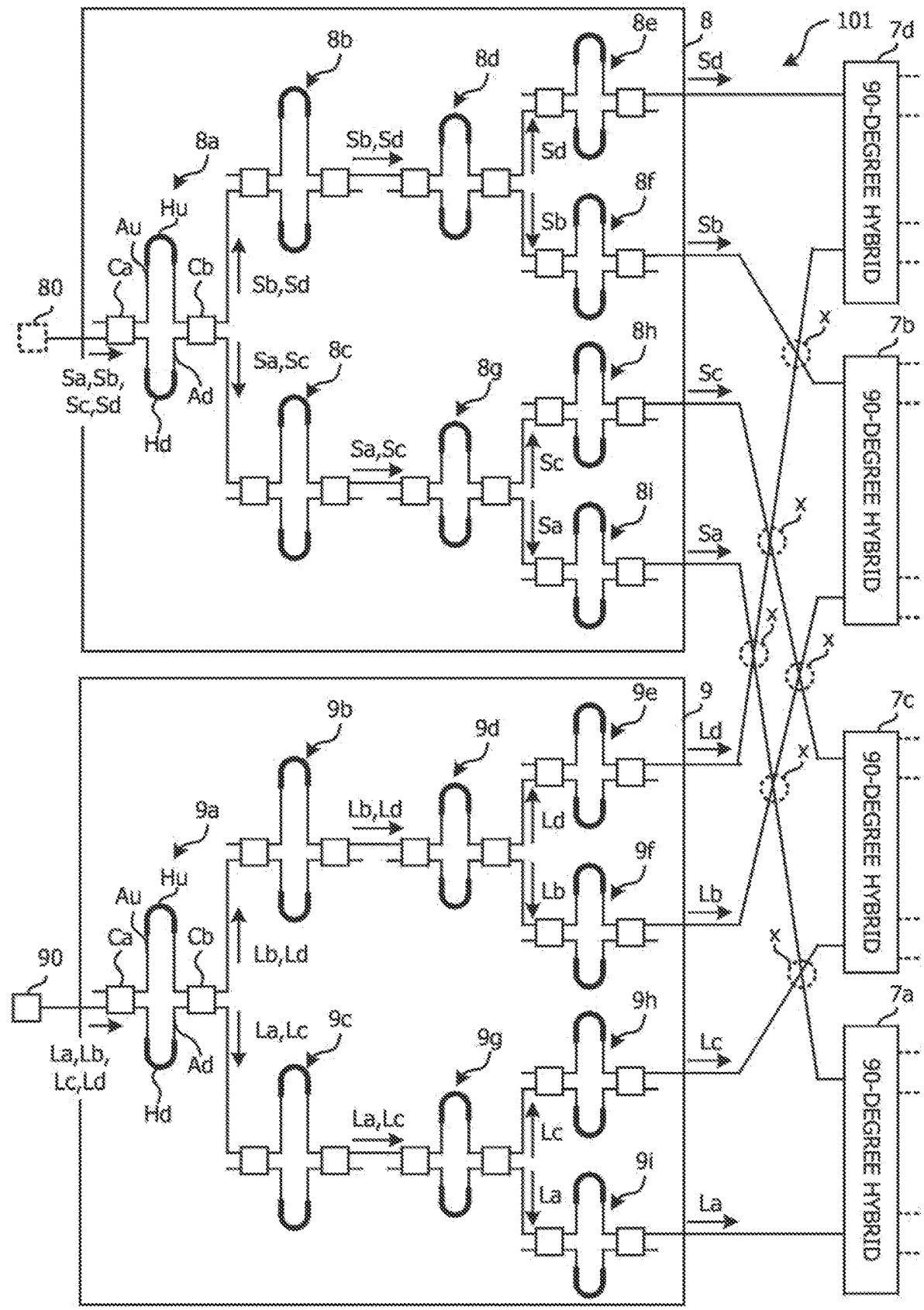
FIG. 1 is a configuration diagram illustrating a communication device of a comparative example.

FIG. 1 is a configuration diagram illustrating a communication device 101 of a comparative example. As an example, the communication device 101 receives a wavelength multiplexing optical signal inputted from a transmitting-side communication device 80 by detecting each wavelength light in multi-wavelength local oscillation light. The communication devices 80 and 101 may be transmission devices having a transmission function and a reception function. The wavelength multiplexing optical signal includes four signal lights Sa to Sd having different wavelengths, and the multi-wavelength local oscillation light includes four local oscillation lights La to Ld having the same center wavelength as the signal lights Sa to Sd. The numbers of the signal lights Sa to Sd and the local oscillation lights La to Ld are not limited to four.

The communication device 101 includes: an optical demultiplexer 8 that demultiplexes the wavelength multiplexing optical signal into the signal lights Sa to Sd; a light source 90 of the multi-wavelength local oscillation light; an optical demultiplexer 9 that demultiplexes the multi-wavelength local oscillation light into the local oscillation lights La to Ld; and 90-degree hybrid circuits 7a to 7d. The optical demultiplexers 8 and 9 and the 90-degree hybrid circuits 7a to 7d are, for example, silicon photonics integrated circuits (PICs) formed on a common substrate.

A wavelength multiplexing optical signal is inputted from the transmitting-side communication device 80 to the optical demultiplexer 8 through a transmission path (not illustrated) such as an optical fiber, while the multi-wavelength local oscillation light is inputted to the optical demultiplexer 9 from the light source 90. The light source 90 includes, for example, a laser diode and a driver for adjusting the wavelength of output light from the laser diode, or the like. The signal lights Sa to Sd are inputted from the optical demultiplexer 8 to the 90-degree hybrid circuits 7a to 7d, respectively, and the local oscillation lights La to Ld are further inputted thereto from the optical demultiplexer 9, respectively.

The 90-degree hybrid circuits 7a to 7d detect the signal lights Sa to Sd by means of the local oscillation lights La to Ld, respectively. For example, the 90-degree hybrid circuits 7a to 7d detect the signal lights Sa to Sd by means of waveguides that cause the signal lights Sa to Sd and the local oscillation lights La to Ld to interfere with each other. The 90-degree hybrid circuits 7a to 7d output optical electric field components corresponding to the amplitude and phase of an I channel and a Q channel to photodiodes in the subsequent stage (not illustrated) as the detection result, respectively. The 90-degree hybrid circuits 7d and 7b are an example of a first detection circuit, while the 90-degree hybrid circuits 7c and 7a are an example of a second detection circuit.

The optical demultiplexer 8 has nine asymmetric Mach-Zehnder interferometers (hereinafter referred to as AMZs) 8a to 8i coupled in multiple stages in a tree shape. The AMZs 8a to 8i each have a pair of arms Au and Ad having different lengths (waveguide lengths), an input coupler Ca, and an output coupler Cb. The input coupler Ca and the output coupler Cb are 2×2 couplers each having two input ports and two output ports, respectively.

The two output ports of the input coupler Ca are optically coupled to input ends of the pair of arms Au and Ad, respectively, and the two input ports of the output coupler Cb are optically coupled to output ends of the pair of arms Au and Ad, respectively. The signal lights Sa to Sd inputted to the input coupler Ca are inputted to the pair of arms Au and Ad.

The upper arm Au is provided with a phase shifter Hu, and the lower arm Ad is provided with a phase shifter Hd. The phase shifters Hu and Hd are heaters formed of a metal (resistor) thin film such as tungsten, titanium, and platinum, for example, and change the temperature of the waveguide inside the arms Au and Ad. As a result, the refractive index in the arms Au and Ad changes, and thus the optical phase in the arms Au and Ad is adjusted.

The configuration of the phase shifters Hu and Hd is not limited to that described above, and may be configured to electrically change the carrier density in the waveguide of each of the arms Au and Ad by the carrier plasma effect. The illustration of a configuration for controlling the adjustment amount of the optical phase with respect to the phase shifters Hu and Hd is omitted.

The light inputted to each of the arms Au and Ad is transmitted based on a transmission band according to the difference in length between the arms Au and Ad (hereinafter referred to as the arm length difference). The light outputted from the arms Au and Ad is demultiplexed through the two output ports of the output coupler Cb.

The optical demultiplexer 9 has nine AMZs 9a to 9i coupled in multiple stages in a tree shape. As in the case of the AMZs 8a to 8i, the AMZs 9a to 9i each have a pair of arms Au and Ad having different lengths (waveguide lengths), an input coupler Ca, and an output coupler Cb.

The wavelength multiplexing optical signals (Sa to Sd) are inputted to the AMZ 8a at the first stage of the optical demultiplexer 8. The multi-wavelength local oscillation lights (La to Ld) are inputted to the AMZ 9a at the first stage of the optical demultiplexer 9.

Figure 2:
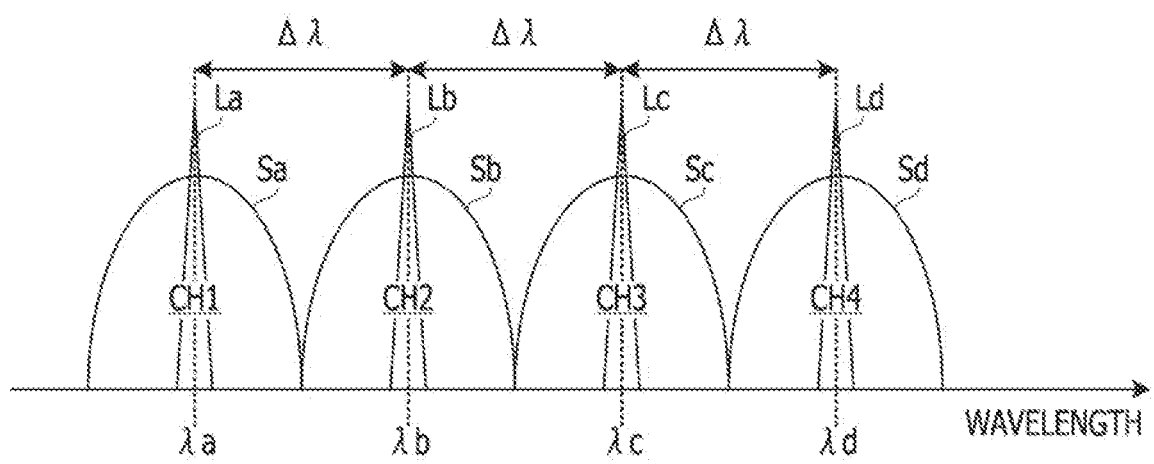
FIG. 2 is a diagram illustrating an example of spectra of wavelength multiplexing optical signals and multi-wavelength local oscillation light.

FIG. 2 is a diagram illustrating an example of spectra of wavelength multiplexing optical signals and multi-wavelength local oscillation light. The horizontal axis in FIG. 2 represents the wavelength.

The wavelength multiplexing optical signal includes signal lights Sa to Sd in which a spacing Δλ between the center wavelengths is fixed, and the multi-wavelength local oscillation light includes local oscillation lights La to Ld having the same center wavelengths λa to λd as the signal lights Sa to Sd, respectively. For example, the signal light Sa and the local oscillation light La have the same center wavelengths λa, the signal light Sb and the local oscillation light Lb have the same center wavelengths λb, the signal light Sc and the local oscillation light Lc have the same center wavelengths λc, and the signal light Sd and the local oscillation light Ld have the same center wavelengths λd.

For example, channels CH1 to CH4 for wavelength-division multiplexing transmission are assigned to the signal lights Sa to Sd, respectively. The transmitting-side communication device 80 generates a wavelength multiplexing optical signal by wavelength division multiplexing after optically modulating light having each of the center wavelengths λa to λd with a main signal of each of the channels CH1 to CH4. The wavelength multiplexing optical signal is an example of multi-wavelength signal light, and the signal lights Sa to Sd are an example of a plurality of signal light components with a fixed spacing between the center wavelengths.

Referring back to FIG. 1, the optical demultiplexer 8 that demultiplexes the wavelength multiplexing optical signal performs demultiplexing processing in units of the AMZs 8a to 8c, AMZs 8d to 8f, and AMZs 8g to 8i, respectively. The wavelength spacing of the transmission band of the AMZs 8a to 8i is determined based on the arm length difference. For example, the wavelength spacing of the transmission band of the AMZs 8a to 8i is substantially inversely proportional to the arm length difference.

The arm length difference between the AMZs 8a to 8c is set so that the wavelength spacing of the transmission band is the spacing Δλ of the center wavelength. The arm length difference between the AMZs 8d to 8f and the AMZs 8g to 8i is set to ½ times the arm length difference of the AMZs 8a to 8c so that the wavelength spacing of the transmission band is twice the spacing Δλ (2×Δλ) of the center wavelength.

The AMZs 8a to 8c demultiplex the signal lights Sa to Sd into a multiplexed light of the signal lights Sb and Sd and a multiplexed light of the signal lights Sa and Sc through the transmission band having the spacing Δλ. The upper arm Au of the AMZ 8a on the input side transmits the signal lights Sb and Sd and leads the lights from the output coupler Cb to the AMZ 8b in the subsequent stage, and the lower arm Ad of the AMZ 8a on the input side transmits the signal lights Sb and Sd and leads the lights from the output coupler Cb to the AMZ 8b in the subsequent stage. The multiplexed light of the signal lights Sb and Sd is inputted from the output coupler Cb of the AMZ 8b to the AMZ 8d in the subsequent stage, and the multiplexed light of the signal lights Sa and Sc is inputted from the output coupler Cb of the AMZ 8c to the AMZ 8g in the subsequent stage.

The AMZs 8d to 8f demultiplex the multiplexed light of the signal lights Sb and Sd into the signal lights Sb and Sd through the transmission band having the spacing Δλ/2. The signal light Sd is inputted from the output coupler Cb of the AMZ 8e to the 90-degree hybrid circuit 7d in the subsequent stage, and the signal light Sb is inputted from the output coupler Cb of the AMZ 8f to the 90-degree hybrid circuit 7b in the subsequent stage.

The AMZs 8g to 8i demultiplex the multiplexed light of the signal lights Sc and Sa into the signal lights Sc and Sa through the transmission band having the spacing Δλ/2. The signal light Sc is inputted from the output coupler Cb of the AMZ 8h to the 90-degree hybrid circuit 7c in the subsequent stage, and the signal light Sa is inputted from the output coupler Cb of the AMZ 8i to the 90-degree hybrid circuit 7a in the subsequent stage.

The optical demultiplexer 9 that demultiplexes the multi-wavelength local oscillation light performs demultiplexing processing in each unit of the AMZs 9a-9c, the AMZs 9d to 9f, and the AMZs 9g to 9i, as in the case of the optical demultiplexer 8. The wavelength spacing of the transmission band of the AMZs 9a to 9i is determined based on the arm length difference. For example, the wavelength spacing of the transmission band of the AMZs 9a to 9i is substantially inversely proportional to the arm length difference.

The AMZs 9a to 9c demultiplex the local oscillation lights La to Ld into the multiplexed light of the local oscillation lights Lb and Ld and the multiplexed light of the local oscillation lights La and Lc through the transmission band having the spacing Δλ. The upper arm Au of the AMZ 9a on the input side transmits the local oscillation lights Lb and Ld and leads the lights from the output coupler Cb to the AMZ 9b in the subsequent stage, and the lower arm Ad of the AMZ 9a on the input side transmits the local oscillation lights La and Lc and leads the lights from the output coupler Cb to the AMZ 9b in the subsequent stage. The multiplexed light of the local oscillation lights Lb and Ld is inputted from the output coupler Cb of the AMZ 9b to the AMZ 9d in the subsequent stage, and the multiplexed light of the local oscillation lights La and Lc is inputted from the output coupler Cb of the AMZ 9c to the AMZ 9g in the subsequent stage.

The AMZs 9d to 9f demultiplex the multiplexed light of the local oscillation lights Lb and Ld into the local oscillation lights Lb and Ld through the transmission band having the spacing Δλ/2. The local oscillation light Ld is inputted from the output coupler Cb of the AMZ 9e to the 90-degree hybrid circuit 7d in the subsequent stage, and the local oscillation light Lb is inputted from the output coupler Cb of the AMZ 9f to the 90-degree hybrid circuit 7b in the subsequent stage.

The AMZs 9g to 9i demultiplex the multiplexed light of the local oscillation lights Lc and La into the local oscillation lights Lc and La through the transmission band having the spacing Δλ/2. The local oscillation light Lc is inputted from the output coupler Cb of the AMZ 9h to the 90-degree hybrid circuit 7c in the subsequent stage, and the local oscillation light La is inputted from the output coupler Cb of the AMZ 9i to the 90-degree hybrid circuit 7a in the subsequent stage.

As described above, the signal lights Sa to Sd are inputted from the optical demultiplexer 8 to the 90-degree hybrid circuits 7a to 7d, respectively, and the local oscillation lights La to Ld are further inputted thereto from the optical demultiplexer 9, respectively. Therefore, the communication device 101 may normally detect and receive the signal lights Sa to Sd.

However, when the two optical demultiplexers 8 and 9 are provided as in this example, the scale of the communication device 101 increases as compared with the case where only a single optical demultiplexer may be provided. As a result, not only the power consumption increases, but also the intersection x between the waveguides of the each optical demultiplexers 8 and 9 on the substrate increases, for example, and the crosstalk and power loss of the signal lights Sa to Sd may also increase. In the case of this example, the number of intersections x of the waveguides of the signal light Sa and the local oscillation light Ld is 3 (=the number of wavelengths (4)−1), which is the largest.

Embodiments

[Communication Device]

Figure 3:
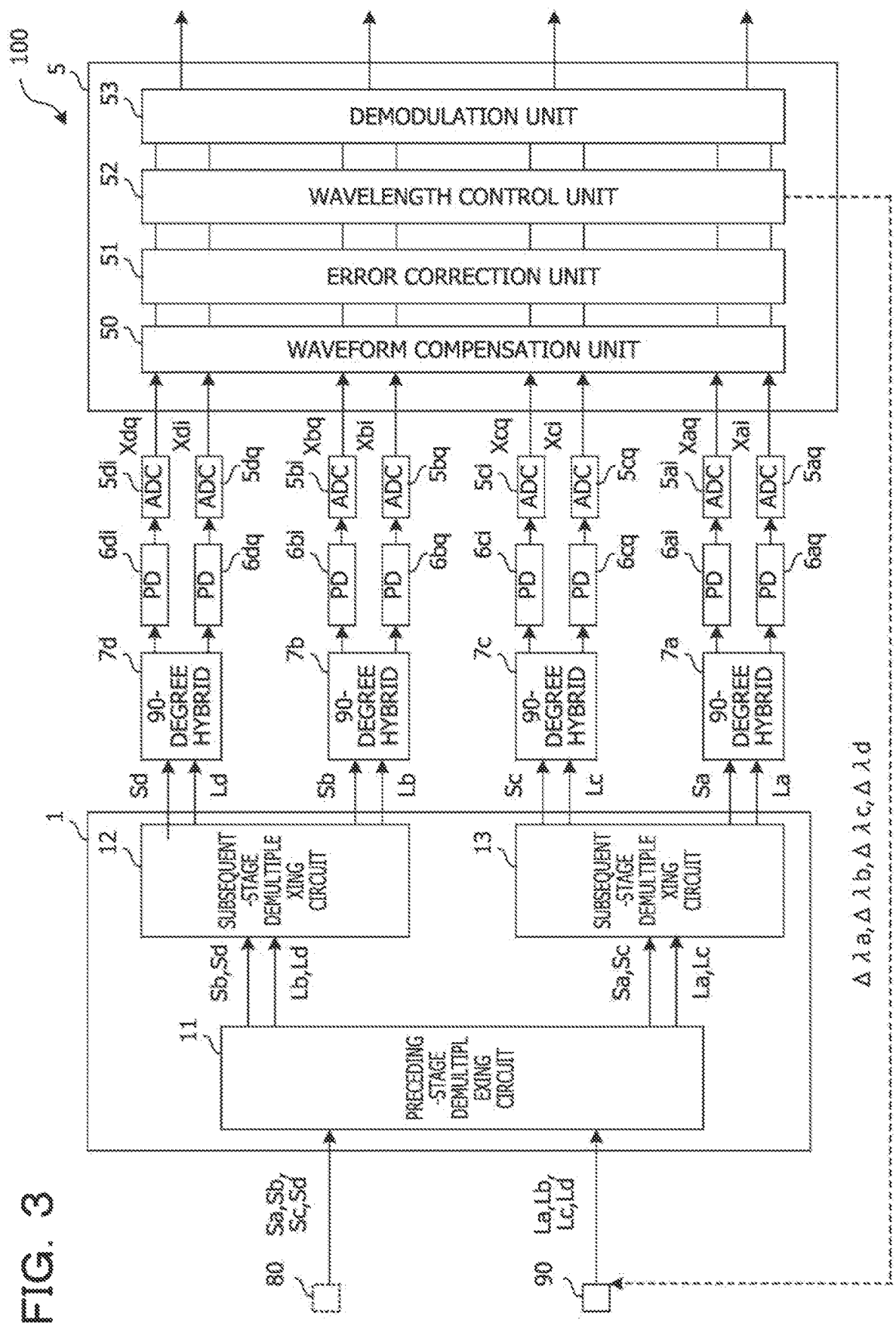
FIG. 3 is a configuration diagram illustrating a communication device of an embodiment.

FIG. 3 is a configuration diagram illustrating a communication device 100 of the embodiment. In FIG. 3, configurations common to those in FIG. 1 are denoted by the same reference numerals as those in FIG. 1 and description thereof is omitted.

As an example, the communication device 100 receives a wavelength multiplexing optical signal inputted from a transmitting-side communication device 80 by detecting each wavelength light in multi-wavelength local oscillation light. The wavelength multiplexing optical signal is as described above for the multi-wavelength local oscillation light.

The communication device 100 includes an optical demultiplexer 1, 90-degree hybrid circuits 7a to 7d, photodiodes (PDs) 6ai to 6di and 6aq to 6dq, analog-to-digital converter (ADC) signal processing circuits 5ai to 5di and 5aq to 5dq, and a light source 90. The optical demultiplexer 1, the 90-degree hybrid circuits 7a to 7d, and the PDs 6ai to 6di and 6aq to 6dq are silicon photonics integrated circuits formed on a common substrate, for example.

The optical demultiplexer 1 has a preceding-stage demultiplexing circuit 11 and subsequent-stage demultiplexing circuits 12 and 13. The subsequent-stage demultiplexing circuits 12 and 13 are optically coupled at the subsequent stage of the preceding-stage demultiplexing circuit 11. A wavelength multiplexing optical signal is inputted from the transmitting-side communication device 80 to the preceding-stage demultiplexing circuit 11 through a transmission path such as an optical fiber, and a multi-wavelength local oscillation light is further inputted thereto from the light source 90. The preceding-stage demultiplexing circuit 11 is an example of a first optical processing unit.

On the other hand, a multiplexed light of the signal lights Sb and Sd and a multiplexed light of the local oscillation lights Lb and Ld are inputted from the preceding-stage demultiplexing circuit 11 to the subsequent-stage demultiplexing circuit 12. The subsequent-stage demultiplexing circuit 12 demultiplexes the signal lights Sb and Sd and the local oscillation lights Lb and Ld, respectively, outputs the signal light Sd and the local oscillation light Ld to the 90-degree hybrid circuit 7d, and outputs the signal light Sb and the local oscillation light Lb to the 90-degree hybrid circuit 7b.

A multiplexed light of the signal lights Sa and Sc and a multiplexed light of the local oscillation lights La and Lc are inputted from the preceding-stage demultiplexing circuit 11 to the other subsequent-stage demultiplexing circuit 13. The subsequent-stage demultiplexing circuit 13 demultiplexes the signal lights Sa and Sc and the local oscillation lights La and Lc, respectively, outputs the signal light Sc and the local oscillation light Lc to the 90-degree hybrid circuit 7c, and outputs the signal light Sa and the local oscillation light La to the 90-degree hybrid circuit 7a. The subsequent-stage demultiplexing circuits 12 and 13 are an example of second and third optical processing units.

The 90-degree hybrid circuit 7a outputs optical electric field components corresponding to the amplitude and phase of an I channel and a Q channel to the subsequent-stage PDs 6di and 6dq, respectively, as the detection result of the signal light Sa. The PDs 6di and 6dq convert the optical electric field components into electrical analog signals and output the analog signals to the subsequent-stage ADCs 5di and 5dq, respectively. The ADCs 5di and 5dq convert the analog signals into digital signals and output the digital signals as I-channel and Q-channel electric field signals Xdq and Xdi to a signal processing circuit 5.

The 90-degree hybrid circuit 7b outputs optical electric field components corresponding to the amplitude and phase of the I channel and Q channel to the subsequent-stage PDs 6bi and 6bq, respectively, as the detection result of the signal light Sb. The PDs 6bi and 6bq convert the optical electric field components into electrical analog signals and output the analog signals to the subsequent-stage ADCs 5bi and 5bq, respectively. The ADCs 5bi and 5bq convert the analog signals into digital signals and output the digital signals as I-channel and Q-channel electric field signals Xbq and Xbi to the signal processing circuit 5.

The 90-degree hybrid circuit 7c outputs optical electric field components corresponding to the amplitude and phase of the I channel and Q channel to the subsequent-stage PDs 6ci and 6cq, respectively, as the detection result of the signal light Sc. The PDs 6ci and 6cq convert the optical electric field components into electrical analog signals and output the analog signals to the subsequent-stage ADCs 5ci and 5cq, respectively. The ADCs 5ci and 5cq convert the analog signals into digital signals and output the digital signals as I-channel and Q-channel electric field signals Xcq and Xci to the signal processing circuit 5.

The 90-degree hybrid circuit 7a outputs optical electric field components corresponding to the amplitude and phase of the I channel and Q channel to the subsequent-stage PDs 6ai and 6aq, respectively, as the detection result of the signal light Sa. The PDs 6ai and 6aq convert the optical electric field components into electrical analog signals and output the analog signals to the subsequent-stage ADCs 5ai and 5aq, respectively. The ADCs 5ai and 5aq convert the analog signals into digital signals and output the digital signals as I-channel and Q-channel electric field signals Xaq and Xai to the signal processing circuit 5.

The signal processing circuit 5 is, for example, a circuit configured by hardware such as a field-programmable gate array (FPGA) or an application-specified integrated circuit (ASIC). The signal processing circuit 5 includes, for example, a waveform compensation unit 50, an error correction unit 51, a wavelength control unit 52, and a demodulation unit 53.

The waveform compensation unit 50 compensates for distortions of the signal lights Sa to Sd generated in the transmission path for the electric field signals Xai to Xdi and Xaq to Xdq, for example, by using a filter or the like. The electric field signals Xai to Xdi and Xaq to Xdq are inputted from the waveform compensation unit 50 to the error correction unit 51.

The error correction unit 51 performs forward error correction (FEC) or the like, for example, to correct errors of the signal lights Sa to Sd with respect to the electric field signals Xai to Xdi and Xaq to Xdq. The electric field signals Xai to Xdi and Xaq to Xdq are inputted from the error correction unit 51 to the wavelength control unit 52.

The wavelength control unit 52 controls the center wavelengths λa to λd of the respective local oscillation lights La to Ld with respect to the light source 90 according to the detection result from the 90-degree hybrid circuits 7a to 7d. For example, the wavelength control unit 52 calculates correction amounts Δλa to Δλd of the center wavelengths λa to λd based on the signal quality of the signal lights Sa to Sd and notifies the light source 90 of the calculation result. The light source 90 adjusts the center wavelengths λa to λd based on the correction amounts Δλa to Δλd, respectively.

Thus, the signal quality of the signal lights Sa to Sd is improved. As an example, the signal quality of the signal lights Sa to Sd includes, but is not limited to, an error rate of the signal lights Sa to Sd obtained from the error correction unit 51. The electric field signals Xai to Xdi and Xaq to Xdq are inputted from the wavelength control unit 52 to the demodulation unit 53.

The demodulation unit 53 performs demodulation processing on the electric field signals Xai to Xdi and Xaq to Xdq according to a modulation method of the signal lights Sa to Sd in the transmitting-side communication device 80.

[Configuration of Optical Demultiplexer]

Figure 4:
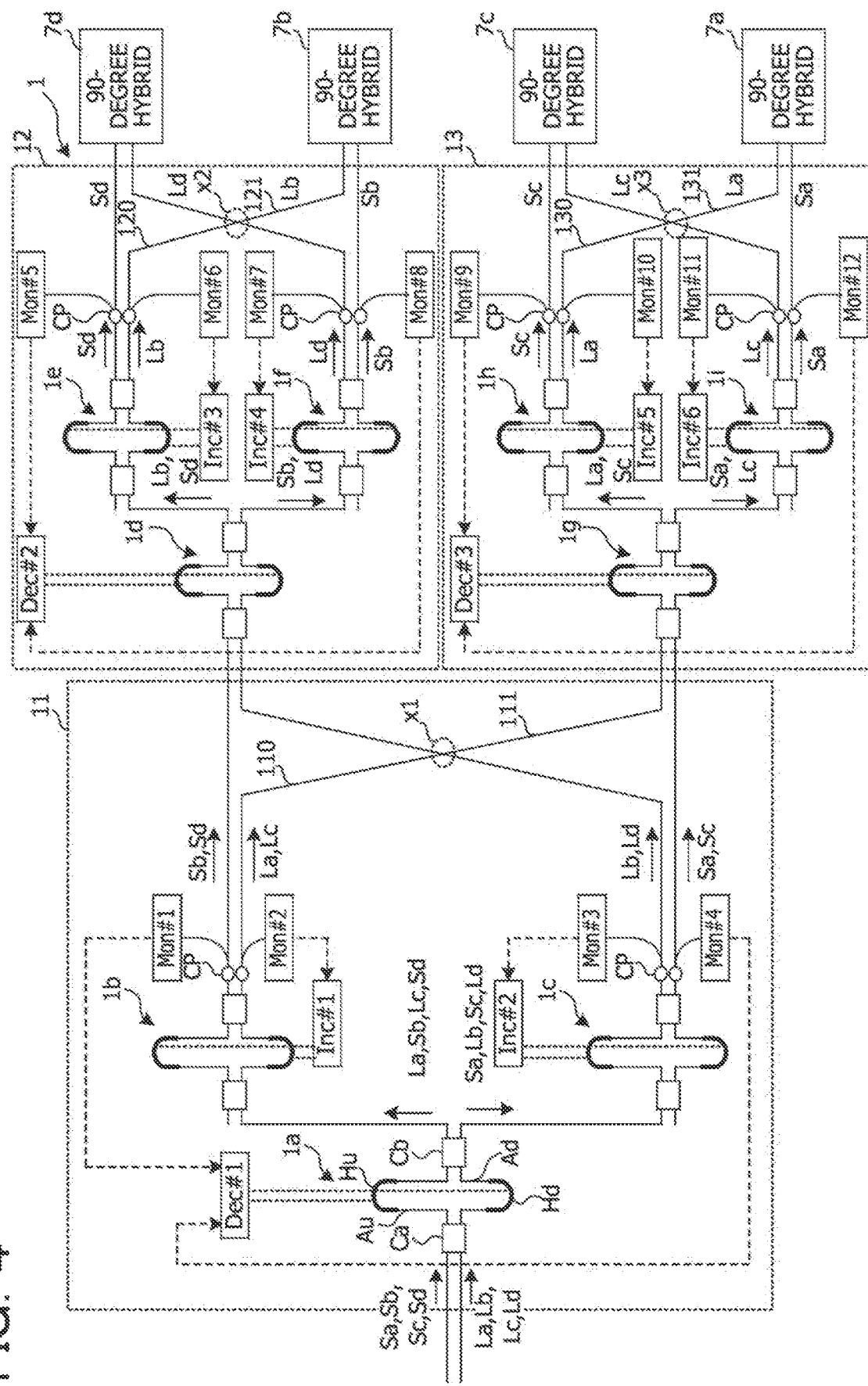
FIG. 4 is a configuration diagram illustrating an example of an optical demultiplexer.

FIG. 4 is a configuration diagram illustrating an example of the optical demultiplexer 1. In FIG. 4, configurations common to those in FIGS. 1 and 2 are denoted by the same reference numerals as those in FIGS. 1 and 2 and description thereof is omitted.

The optical demultiplexer 1 performs demultiplexing processing in units of each of the preceding-stage demultiplexing circuit 11 and the subsequent-stage demultiplexing circuits 12 and 13. The preceding-stage demultiplexing circuit 11 has AMZs 1a to 1c, the subsequent-stage demultiplexing circuit 12 has AMZs 1d to 1f, and the subsequent-stage demultiplexing circuit 13 has AMZs 1g to 1i. The AMZs 1a to 1i have the same configuration as the AMZs 8a to 8i and 9a to 9i described above.

Phase shifters Hu and Hd of the AMZ 1a are an example of a first phase shifter that adjusts optical phases in the pair of arms Au and Ad of the AMZ 1a, respectively. Phase shifters Hu and Hd of the AMZ 1b are an example of a second phase shifter that adjusts optical phases in the pair of arms Au and Ad of the AMZ 1b, respectively. Phase shifters Hu and Hd of the AMZ 1c are an example of a third phase shifter that adjusts optical phases in the pair of arms Au and Ad of the AMZ 1c, respectively.

The AMZs 1a to 1i are coupled in multiple stages in a tree shape. For example, the AMZs 1b and 1c are optically coupled at the subsequent stage of the AMZ 1a, the AMZs 1d and 1g are optically coupled at the subsequent stage of the AMZ 1b, and the AMZs 1d and 1g are optically coupled at the subsequent stage of the AMZ 1c. The AMZ 1a is an example of a first asymmetric Mach-Zehnder interferometer, the AMZ 1b is an example of a second asymmetric Mach-Zehnder interferometer, and the AMZ 1c is an example of a third asymmetric Mach-Zehnder interferometer.

The AMZs 1e and 1f are optically coupled at the subsequent stage of the AMZ 1d, and 90-degree hybrid circuits 7d and 7b are optically coupled at the subsequent stage of the AMZs 1e and 1f. The AMZs 1h and 1i are optically coupled at the subsequent stage of the AMZ 1g, and 90-degree hybrid circuits 7c and 7a are optically coupled at the subsequent stage of the AMZs 1h and 1i. One of the input ports of the input coupler Ca of the AMZs 1b, 1c, 1e, 1f, 1h, and 1i is open.

The wavelength spacing of the transmission band of the AMZs 1a to 1i is determined based on the arm length difference. For example, the wavelength spacing of the transmission band of the AMZs 1a to 1i is substantially inversely proportional to the arm length difference.

The arm length difference between the AMZs 1a to 1c of the preceding-stage demultiplexing circuit 11 is set so that the wavelength spacing of the transmission band is the spacing $\Delta\lambda$ between the center wavelengths $\lambda a$ and $\Delta d$. Therefore, the preceding-stage demultiplexing circuit 11 transmits and demultiplexes the signal lights Sa to Sd and the local oscillation lights La to Ld in the transmission band having the spacing $\Delta\lambda$.

The arm length difference between the AMZs 1d to 8i is set to ½ times the arm length difference between the AMZs 8a to 8c so that the wavelength spacing of the transmission band is twice the spacing $\Delta\lambda$ (2×$\Delta\lambda$) of the center wavelength. Therefore, the subsequent-stage demultiplexing circuits 12 and 13 transmit and demultiplex the signal lights Sa to Sd and the local oscillation lights La to Ld in the transmission band having the spacing $\Delta\lambda$.

Waveguides 110 and 111 extending from one of the output ports of the output couplers Cb of the AMZs 1b and 1c intersect at the intersection x1 and are coupled to one of the input ports of the input coupler Ca of the AMZs 1d and 1g in the subsequent stage. Waveguides 120 and 121 extending from one of the output ports of the output couplers Cb of the AMZs 1e and 1f intersect at the intersection x2 and are coupled to the 90-degree hybrid circuits 7b and 7d in the subsequent stage, respectively. Waveguides 130 and 131 extending from one of the output ports of the output couplers Cb of the AMZs 1h and 1i intersect at the intersection x3 and are coupled to the 90-degree hybrid circuits 7a and 7c in the subsequent stage, respectively.

Thus, the preceding-stage demultiplexing circuit 11 and the subsequent-stage demultiplexing circuits 12 and 13 have the waveguides intersecting at the intersections x1 to x3, and thus sets of signal light Sa to Sd and local oscillation lights La to Ld having the same center wavelength are inputted to the 90-degree hybrid circuits 7a to 7d, respectively. The details will be described later.

In order to control the respective phase shifters Hu and Hd of the AMZs 1a to 1i, the optical demultiplexer 1 includes: monitor circuits Mon #1 to #12 that monitor the power of output light; control circuits Dec #1 to #3 that reduce the power according to the monitoring result of the power of the output light; and control circuits Inc #1 to #6 that increase the power according to the monitoring result of the power of the output light. The monitor circuits Mon #1 to #12 are realized by photodiodes, for example, and the control circuits Dec #1 to #3 and Inc #1 to #6 are realized by FPGAs, ASICs, or the like, for example.

The monitor circuits Mon #1 to #4 and the control circuits Dec #1, Inc #1 and #2 are provided in the preceding-stage demultiplexing circuit 11. The monitor circuits Mon #1 and #2 are optically coupled to the pair of output ports of the output coupler Cb of the AMZ 1b through a branch coupler CP, respectively. The monitor circuit Mon #1 monitors the power of the signal lights Sb and Sd outputted from the AMZ 1b to the AMZ 1d. The monitor circuit Mon #1 notifies the control circuit Dec #1 of the power of the monitoring result. The monitor circuit Mon #2 monitors the power of the local oscillation lights La and Lc outputted from the AMZ 1b to the AMZ 1g. The monitor circuit Mon #2 notifies the control circuit Inc #1 of the power of the monitoring result.

The monitor circuits Mon #3 and #4 are optically coupled to the pair of output ports of the output coupler Cb of the AMZ 1c through the branch coupler CP, respectively. The monitor circuit Mon #3 monitors the power of the local oscillation lights Lb and Ld outputted from the AMZ 1c to the AMZ 1d. The monitor circuit Mon #3 notifies the control circuit Inc #2 of the power of the monitoring result. The monitor circuit Mon #4 monitors the power of the signal lights Sa and Sc outputted from the AMZ 1c to the AMZ 1g. The monitor circuit Mon #4 notifies the control circuit Dec #1 of the power of the monitoring result.

The control circuit Dec #1 is an example of a first phase control unit, which controls the adjustment amount of the optical phase with respect to the phase shifters Hu and Hd of the AMZ 1a according to the each monitoring results on the signal lights Sa to Sd from the monitor circuits Mon #1 and #4. The control circuit Inc #1 is an example of a second phase control unit, which controls the adjustment amount of the optical phase with respect to the phase shifters Hu and Hd of the AMZ 1b according to the monitoring results on the local oscillation lights Lb and Ld from the monitor circuit Mon #2. The control circuit Inc #2 is an example of a third phase control unit, which controls the adjustment amount of the optical phase with respect to the phase shifters Hu and Hd of the AMZ 1c according to the monitoring results on the local oscillation lights La and Lc from the monitor circuit Mon #3.

The monitor circuit Mon #1 is an example of a first monitoring unit that monitors the power of the signal lights Sb and Sd outputted from the AMZ 1b to the AMZ 1d, while the monitor circuit Mon #4 is an example of a second monitoring unit that monitors the power of the signal lights Sa and Sc outputted from the AMZ 1c to the AMZ 1g. The monitor circuit Mon #2 is an example of a third monitoring unit that monitors the power of the local oscillation lights La and Lc outputted from the AMZ 1b to the AMZ 1g, and the monitor circuit Mon #3 is an example of a fourth monitoring unit that monitors the power of the local oscillation lights Lb and Ld outputted from the AMZ 1c to the AMZ 1d.

The monitor circuits Mon #5 to #8 and the control circuits Dec #2, Inc #3, and #4 are provided in the subsequent-stage demultiplexing circuit 12. The monitor circuits Mon #5 and #6 are optically coupled to the pair of output ports of the output coupler Cb of the AMZ 1e through the branch coupler CP, respectively. The monitor circuit Mon #5 monitors the power of the signal light Sd outputted from the AMZ 1e to the 90-degree hybrid circuit 7d. The monitor circuit Mon #5 notifies the control circuit Dec #2 of the power of the monitoring result. The monitor circuit Mon #6 monitors the power of the local oscillation light Lb outputted from the AMZ 1e to the 90-degree hybrid circuit 7b. The monitor circuit Mon #6 notifies the control circuit Dec #3 of the power of the monitoring result.

The monitor circuits Mon #7 and #8 are optically coupled to the pair of output ports of the output coupler Cb of the AMZ 1f through the branch coupler CP, respectively. The monitor circuit Mon #7 monitors the power of the local oscillation light Ld outputted from the AMZ 1f to the 90-degree hybrid circuit 7d. The monitor circuit Mon #7 notifies the control circuit Inc #4 of the power of the monitoring result. The monitor circuit Mon #8 monitors the power of the signal light Sb outputted from the AMZ 1f to the 90-degree hybrid circuit 7b. The monitor circuit Mon #8 notifies the control circuit Dec #2 of the power of the monitoring result.

The control circuit Dec #2 controls the adjustment amount of the optical phase with respect to the phase shifters Hu and Hd of the AMZ 1d according to the monitoring results from the monitor circuits Mon #5 and #8. The control circuit Inc #3 controls the adjustment amount of the optical phase with respect to the phase shifters Hu and Hd of the AMZ 1e according to the monitoring result from the monitor circuit Mon #6. The control circuit Inc #4 controls the adjustment amount of the optical phase with respect to the phase shifters Hu and Hd of the AMZ 1f according to the monitoring result from the monitor circuit Mon #7.

The monitor circuits Mon #9 to #12 and the control circuits Dec #3, Inc #5, and #6 are provided in the subsequent-stage demultiplexing circuit 13. The monitor circuits Mon #9 and #10 are optically coupled to the pair of output ports of the output coupler Cb of the AMZ 1h through the branch coupler CP, respectively. The monitor circuit Mon #9 monitors the power of the signal light Sc outputted from the AMZ 1h to the 90-degree hybrid circuit 7c. The monitor circuit Mon #9 notifies the control circuit Dec #3 of the power of the monitoring result. The monitor circuit Mon #10 monitors the power of the local oscillation light La outputted from the AMZ 1h to the 90-degree hybrid circuit 7a. The monitor circuit Mon #10 notifies the control circuit Inc #5 of the power of the monitoring result.

The monitor circuits Mon #11 and #12 are optically coupled to the pair of output ports of the output coupler Cb of the AMZ 1i through the branch coupler CP, respectively. The monitor circuit Mon #11 monitors the power of the local oscillation light Lc outputted from the AMZ 1i to the 90-degree hybrid circuit 7c. The monitor circuit Mon #11 notifies the control circuit Inc #6 of the power of the monitoring result. The monitor circuit Mon #12 monitors the power of the signal light Sa outputted from the AMZ 1i to the 90-degree hybrid circuit 7a. The monitor circuit Mon #12 notifies the control circuit Dec #3 of the power of the monitoring result.

The control circuit Dec #3 controls the adjustment amount of the optical phase with respect to the phase shifters Hu and Hd of the AMZ 1g according to the monitoring results from the monitor circuits Mon #9 and #12. The control circuit Inc #5 controls the adjustment amount of the optical phase with respect to the phase shifters Hu and Hd of the AMZ 1h according to the monitoring result from the monitor circuit Mon #10. The control circuit Inc #6 controls the adjustment amount of the optical phase with respect to the phase shifters Hu and Hd of the AMZ 1i according to the monitoring result from the monitor circuit Mon #11.

Thus, the preceding-stage demultiplexing circuit 11 and the subsequent-stage demultiplexing circuits 12 and 13 may demultiplex the signal lights Sa to Sd and the local oscillation lights La to Ld with appropriate power, respectively.

Figure 5:
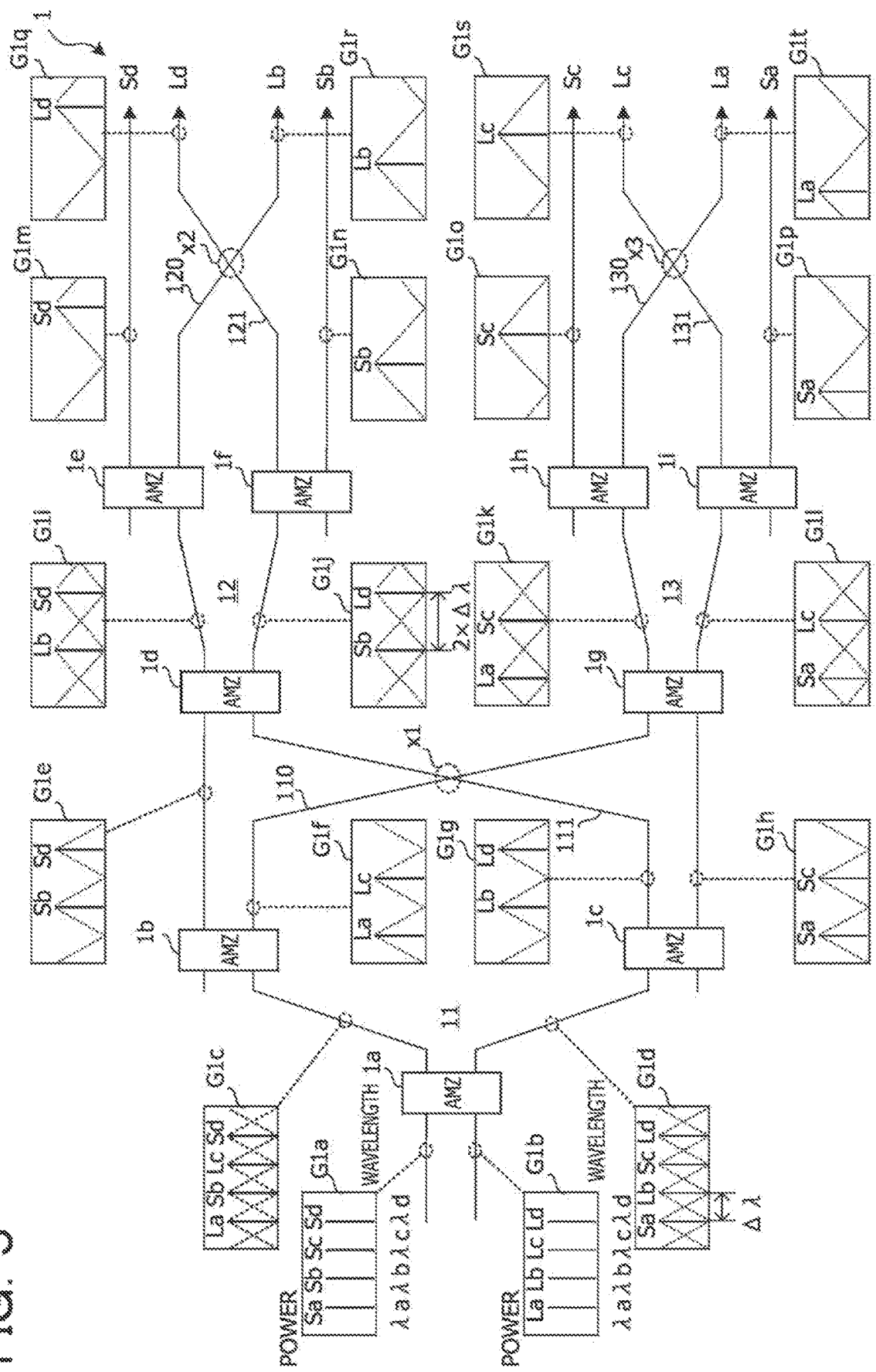
FIG. 5 is a diagram illustrating an example of demultiplexing processing of signal light and local oscillation light by the optical demultiplexer.

FIG. 5 is a diagram illustrating an example of demultiplexing processing of the signal lights Sa to Sd and the local oscillation lights La to Ld by the optical demultiplexer 1. In FIG. 5, configurations common to those in FIG. 4 are denoted by the same reference numerals as those in FIG. 4 and description thereof is omitted. In FIG. 5, the illustration of the monitor circuits Mon #1 to #12 and the control circuits Dec #1 to #3 and Inc #1 to #6 is omitted.

Reference numerals G1a to G1t each denote a wavelength spectrum of light within a waveguide joined to dotted lines. The dotted lines illustrated in the wavelength spectrum denoted by reference numerals G1c to G1t represent the transmission band (transmission spectrum) of the AMZs 1a to 1i.

As represented by reference numeral G1a, a wavelength multiplexing optical signal obtained by wavelength division multiplexing of the signal lights Sa to Sb having the center wavelengths λa to λd at regular spacings Δλ is inputted to one of the input ports of the AMZ 1a. As represented by reference numeral G1b, a multi-wavelength local oscillation light including the local oscillation lights La to Ld having the center wavelengths λa to λd at regular spacings Δλ is inputted to the other input port of the AMZ 1a.

The AMZ 1a transmits the signal lights Sa to Sd and the local oscillation lights La to Ld through the transmission band having the spacing Δλ. The AMZ 1a performs demultiplexing so that the center wavelengths λa to λd of the signal lights Sa to Sd and the center wavelengths λa to λd of the local oscillation lights La to Ld are alternately adjacent to each other, and outputs the demultiplexed lights from the pair of output ports of the output coupler Cb. As a result, the AMZ 1a outputs the signal lights Sb and Sd and the local oscillation lights La and Lc to the subsequent-stage AMZ 1b as indicated by reference numeral G1c among the signal lights Sa to Sd and the local oscillation lights La to Ld inputted to the pair of arms Au and Ad, and outputs the signal lights Sa and Sc and the local oscillation lights Lb and Ld to the subsequent-stage AMZ 1c as indicated by reference numeral G1d.

For example, the AMZ 1a outputs the signal lights Sb and Sd and the local oscillation lights La and Lc having the center wavelengths λa to λd adjacent to each other to the AMZ 1b, and outputs the signal lights Sa and Sc having the same center wavelengths λa and λc as the local oscillation lights La and Lc and the local oscillation lights Lb and Ld having the same center wavelengths λb and λd as the signal lights Sb and Sd to the AMZ 1c. The signal lights Sb and Sd are an example of a first signal light component, and the local oscillation lights La and Lc are an example of a first local oscillation light. The signal lights Sa and Sc are an example of a second signal light component, and the local oscillation lights Lb and Ld are an example of a second local oscillation light. The signal lights Sb and Sd and the local oscillation lights La and Lc are inputted to the pair of arms Au and Ad of the AMZ 1b, while the signal lights Sa and Sc and the local oscillation lights Lb and Ld are inputted to the pair of arms Au and Ad of the AMZ 1c.

The AMZ 1b transmits the signal lights Sb and Sd and the local oscillation lights La and Lc through the transmission band of the spacing $\Delta\lambda$. The AMZ 1b performs demultiplexing so that the center wavelengths λb and λd of the signal lights Sb and Sd are adjacent to each other and the center wavelengths λa and λc of the local oscillation lights La and Lc are adjacent to each other, and outputs the demultiplexed lights from the pair of output ports of the output coupler Cb. Thus, the AMZ 1b outputs the signal lights Sb and Sd to the subsequent-stage AMZ 1d as indicated by reference numeral G1e, and outputs the local oscillation lights La and Lc to the subsequent-stage AMZ 1g as indicated by reference numeral Gif.

The AMZ 1c transmits the signal lights Sa and Sc and the local oscillation lights Lb and Ld through the transmission band of the spacing $\Delta\lambda$. The AMZ 1c performs demultiplexing so that the center wavelengths λa and λc of the signal lights Sa and Sc are adjacent to each other and the center wavelengths λb and λd of the local oscillation lights Lb and Ld are adjacent to each other, and outputs the demultiplexed lights from the pair of output ports of the output coupler Cb. Thus, the AMZ 1c outputs the local oscillation lights Lb and Ld to the subsequent-stage AMZ 1d as indicated by reference numeral G1g, and outputs the signal lights Sa and Sc to the subsequent-stage AMZ 1g as indicated by reference numeral G1h.

Therefore, the preceding-stage demultiplexing circuit 11 may output the signal lights Sb and Sd and the local oscillation lights Lb and Ld having the same center wavelengths λb and λd to the subsequent-stage demultiplexing circuit 12, and may output the signal lights Sa and Sc and the local oscillation lights La and Lc having the same center wavelengths λa and λc to the subsequent-stage demultiplexing circuit 13. The subsequent-stage demultiplexing circuit 12 demultiplexes the signal lights Sb and Sd and local oscillation lights Lb and Ld inputted from the preceding-stage demultiplexing circuit 11, while the subsequent-stage demultiplexing circuit 13 demultiplexes the signal lights Sa and Sc and local oscillation lights La and Lc inputted from the preceding-stage demultiplexing circuit 11.

Therefore, the optical demultiplexer 1 may output the sets of signal lights Sa to Sd and local oscillation lights La to Ld having the same center wavelengths λa to λd in alignment with each other to the subsequent-stage 90-degree hybrid circuits 7a to 7d. As described above, the optical demultiplexer 1 may appropriately demultiplex both the signal lights Sa to Sd and the local oscillation lights La to Ld, and thus the scale of the communication device 100 is reduced as compared with that of the communication device 101 of the comparative example.

The AMZ 1d transmits the signal lights Sb and Sd and the local oscillation lights Lb and Ld through the transmission band of the spacing $(2\times\Delta\lambda)$. The AMZ 1d performs demultiplexing so that the center wavelength λd of the signal light Sd and the center wavelength λb of the local oscillation light Lb are adjacent to each other, and the center wavelength λb of the signal light Sb and the center wavelength λa of the local oscillation light La are adjacent to each other, and outputs the demultiplexed lights from the pair of output ports of the output coupler Cb. Thus, the AMZ 1d outputs the signal light Sb and the local oscillation light Lb to the subsequent-stage AMZ 1e as indicated by reference numeral G1i, and outputs the signal light Sb and the local oscillation light Ld to the subsequent-stage AMZ 1f as indicated by reference numeral G1j.

The AMZ 1e transmits the signal light Sd and the local oscillation light Lb through the transmission band of the spacing $(2\times\Delta\lambda)$. The AMZ 1e outputs the signal light Sd and the local oscillation light Lb from the pair of output ports of the output coupler Cb to the subsequent-stage 90-degree hybrid circuits 7d and 7b, respectively, as indicated by reference numerals G1m and G1r.

The AMZ 1f transmits the signal light Sb and the local oscillation light Ld through the transmission band of the spacing $(2\times\Delta\lambda)$. The AMZ 1f outputs the local oscillation light Ld and the signal light Sb from the pair of output ports of the output coupler Cb to the subsequent-stage 90-degree hybrid circuits 7d and 7b, respectively, as indicated by reference numerals G1q and G1n.

The AMZ 1g transmits the signal lights Sa and Sc and the local oscillation lights La and Lc through the transmission band of the spacing $(2\times\Delta\lambda)$. The AMZ 1g performs demultiplexing so that the center wavelength λc of the signal light Sc and the center wavelength λa of the local oscillation light La are adjacent to each other, and the center wavelength λa of the signal light Sa and the center wavelength λc of the local oscillation light Lc are adjacent to each other, and outputs the demultiplexed lights from the pair of output ports of the output coupler Cb. Thus, the AMZ 1g outputs the signal light Sc and the local oscillation light La to the subsequent-stage AMZ 1h as indicated by reference numeral G1k, and outputs the signal light Sa and the local oscillation light Lc to the subsequent-stage AMZ 1i as indicated by reference numeral G1l.

The AMZ 1h transmits the signal light Sc and the local oscillation light La through the transmission band of the spacing $(2\times\Delta\lambda)$. The AMZ 1h outputs the signal light Sc and the local oscillation light La from the pair of output ports of the output coupler Cb to the subsequent-stage 90-degree hybrid circuits 7c and 7a, respectively, as indicated by reference numerals G1o and G1t.

The AMZ 1i transmits the signal light Sa and the local oscillation light Lc through the transmission band of the spacing $(2\times\Delta\lambda)$. The AMZ 1i outputs the signal light Sa and the local oscillation light Lc from the pair of output ports of the output coupler Cb to the subsequent-stage 90-degree hybrid circuits 7a and 7c, respectively, as indicated by reference numerals G1p and G1s.

Thus, the subsequent-stage demultiplexing circuit 12 demultiplexes the signal lights Sd and Sb and the local oscillation light Ld and Ld, respectively, and outputs the demultiplexed lights to the 90-degree hybrid circuits 7d and 7b, respectively, while the subsequent-stage demultiplexing circuit 13 demultiplexes the signal lights Sa and Sc and the local oscillation lights La and Lc, respectively and outputs the demultiplexed lights to the 90-degree hybrid circuits 7a and 7c, respectively. Therefore, the 90-degree hybrid circuits 7a to 7c may detect the signal lights Sa to Sd by means of the local oscillation lights La to Ld, respectively.

[Operations of Control Circuit]

Next, operations of the control circuits Dec #1 to #3 and Inc #1 to #6 will be described. In this example, it is assumed that the phase shifters Hu and Hd are realized by heaters. It is assumed that the monitor circuits Mon #1 to #12 are realized by photodiodes, and the power of the output light is detected by output current values from the photodiodes.

Figure 6:
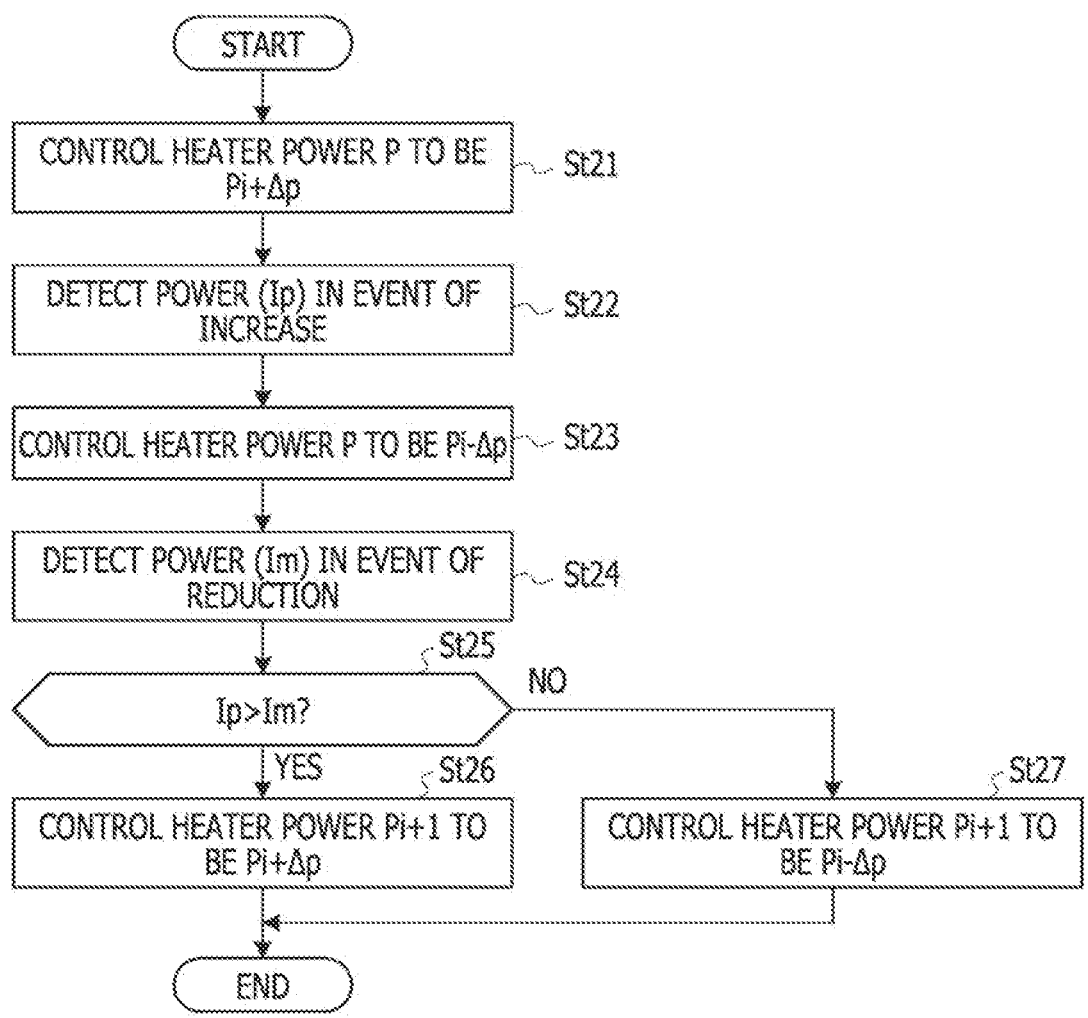
FIG. 6 is a flowchart illustrating an example of an operation of a control circuit to increase the power of output light.

FIG. 6 is a flowchart illustrating an example of operations of the control circuits Inc #1 to #6 to increase the power of the output light. The control circuits Inc #1 to #6 increase the power of the output light based on the monitoring results from the monitor circuits Mon #2, #3, #6, #7, #10, and #11 for each control cycle i (positive integer). In the following description, the control circuits Inc #1 to #6 are simply referred to as the control circuit Inc, and the monitor circuits Mon #1 to #12 are simply referred to as the monitor circuit Mon.

First, the control circuit Inc controls a heater power P of the phase shifters Hu and Hd to be set to a value obtained by adding an adjustment amount $\Delta p$ (>0) to a heater power Pi of a current control cycle i (operation St21). Thus, the amount of heat applied to the arms Au and Ad from the phase shifters Hu and Hd is increased, and the optical phase in the waveguide is adjusted.

Next, the control circuit Inc controls the monitor circuit Mon to detect a current value Ip as the power of the output light when the heater power increases (operation St22). For example, the control circuit Inc #1 controls the monitor circuit Mon #2 to detect the power of multiplexed light of the local oscillation lights La and Lc.

Next, the control circuit Inc controls the heater power P of the phase shifters Hu and Hd to be set to a value obtained by subtracting the adjustment amount $\Delta p$ from the heater power Pi of the current control cycle i (operation St23). Thus, the amount of heat applied to the arms Au and Ad from the phase shifters Hu and Hd is reduced, and the optical phase in the waveguide is adjusted.

Next, the control circuit Inc controls the monitor circuit Mon to detect a current value Im as the power of the output light when the heater power is reduced by (operation St24). For example, the control circuit Inc #1 controls the monitor circuit Mon #2 to detect the power of multiplexed light of the local oscillation lights La and Lc.

Then, the control circuit Inc compares the current value Ip when the heater power is increased with the current value Im when the heater power is reduced (operation St25). Thus, the control circuit Inc determines a control direction of the heater power to increase the power of the output light.

When Ip>Im is satisfied (Yes in operation St25), the control circuit Inc controls the heater power Pi+1 in the next control cycle (i+1) to be set to a value obtained by adding the adjustment amount $\Delta p$ to the heater power Pi in the current control cycle i (operation St26). When Ip Im is satisfied (No in operation St25), the control circuit Inc controls the heater power Pi+1 in the next control cycle (i+1) to be set to a value obtained by subtracting the adjustment amount $\Delta p$ from the heater power Pi in the current control cycle i (operation St27).

Thus, the control circuit Inc controls the heater power Pi so that the power of the output light is increased with respect to the phase shifters Hu and Hd. Thus, the control circuits Inc #1 and #2, for example, control the adjustment amount of the optical phase with respect to the phase shifters Hu and Hd of the AMZs 1b and 1c, respectively. Therefore, the control circuit Inc #1 may perform control to increase the power of the local oscillation lights La and Lc, while the control circuit Inc #2 may perform control to increase the power of the local oscillation lights Lb and Ld.

Figure 7:
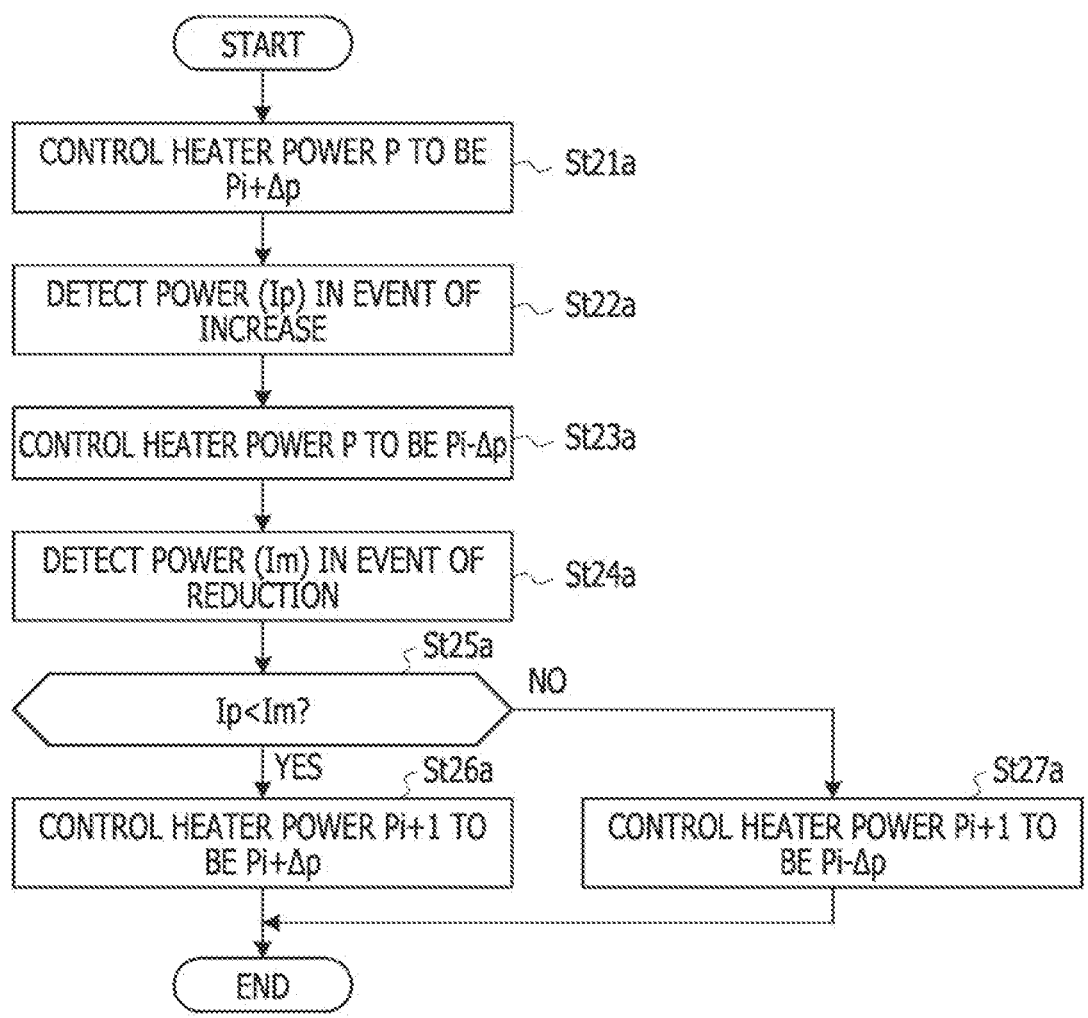
FIG. 7 is a flowchart illustrating an example of an operation of the control circuit to reduce the power of output light.

FIG. 7 is a flowchart illustrating an example of operations of the control circuits Dec #1 to #3 to reduce the power of the output light. The control circuit Dec #1 reduces the power of the output light based on the monitoring results from the monitor circuits Mon #1 and #4 for each control cycle i. The control circuit Dec #2 reduces the power of the output light based on the monitoring results from the monitor circuits Mon #5 and #8 for each control cycle i. The control circuit Dec #3 reduces the power of the output light based on the monitoring results from the monitor circuits Mon #9 and #12 for each control cycle i. In the following description, the control circuits Dec #1 to #3 are simply referred to as the control circuit Dec, and the monitor circuits Mon #1 to #12 are simply referred to as the monitor circuit Mon.

First, the control circuit Dec controls the heater power P of the phase shifters Hu and Hd to be set to a value obtained by adding the adjustment amount $\Delta p$ (>0) to the power Pi of the current control cycle i (operation St21a). Thus, the amount of heat applied to the arms Au and Ad from the phase shifters Hu and Hd is increased, and the optical phase in the waveguide is adjusted.

Next, the control circuit Dec detects the current value Ip as the power of the output light when the heater power is increased by the monitor circuit Mon (operation St22a). For example, the control circuit Dec #1 controls the monitor circuits Mon #1 and #4 to detect the power of the multiplexed light of the signal lights Sb and Sd and the multiplexed light of the signal lights Sa and Sc.

Then, the control circuit Dec controls the heater power P of the phase shifters Hu and Hd to be set to a value obtained by subtracting the adjustment amount $\Delta p$ from the heater power Pi of the current control cycle i (operation St23a). Thus, the amount of heat applied to the arms Au and Ad from the phase shifters Hu and Hd is reduced, and the optical phase in the waveguide is adjusted.

Thereafter, the control circuit Dec controls the monitor circuit Mon to detect the current value Im as the power of the output light when the heater power is reduced (operation St24a). For example, the control circuit Dec #1 controls the monitor circuits Mon #1 and #4 to detect the power of the multiplexed light of the signal lights Sb and Sd and the multiplexed light of the signal lights Sa and Sc.

Next, the control circuit Inc compares the current value Ip when the heater power is increased with the current value Im when the heater power is reduced (operation St25a). Thus, the control circuit Dec determines a control direction of the heater power to increase the power of the output light.

When Ip<Im is satisfied (Yes in operation St25a), the control circuit Inc controls the heater power Pi+1 in the next control cycle (i+1) to be set to a value obtained by adding the adjustment amount $\Delta p$ to the heater power Pi in the current control cycle i (operation St26a). When Ip>Im is satisfied (No in operation St25a), the control circuit Inc controls the heater power Pi+1 in the next control cycle (i+1) to be set to a value obtained by subtracting the adjustment amount Δp from the heater power Pi in the current control cycle i (operation St27a).

Thus, the control circuit Dec controls the heater power Pi with respect to the phase shifters Hu and Hd so that the power of the output light is reduced. Accordingly, the control circuit Dec #1, for example, controls the adjustment amount of the optical phase with respect to the phase shifters Hu and Hd of the AMZ 1a, respectively. Therefore, the control circuit Dec #1 may perform control to increase the power of the signal lights Sa to Sd.

The control circuits Dec #1 to #3 and Inc #1 to #6 have the execution order of control operations controlled by an internal or external monitoring control device of the communication device 100, for example.

Figure 8:
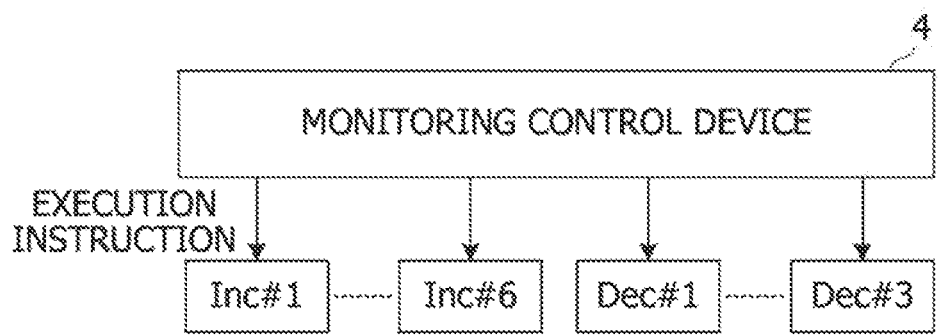
FIG. 8 is a diagram illustrating an example of a monitoring control device and a control circuit.

FIG. 8 is a diagram illustrating an example of the monitoring control device 4 and the control circuits Dec #1 to #3 and Inc #1 to #6. The monitoring control device 4 is a computer including a processor such as a central processing unit (CPU). The monitoring control device 4 instructs the control circuits Dec #1 to #3 and Inc #1 to #6 to execute the control operations.

Figure 9:
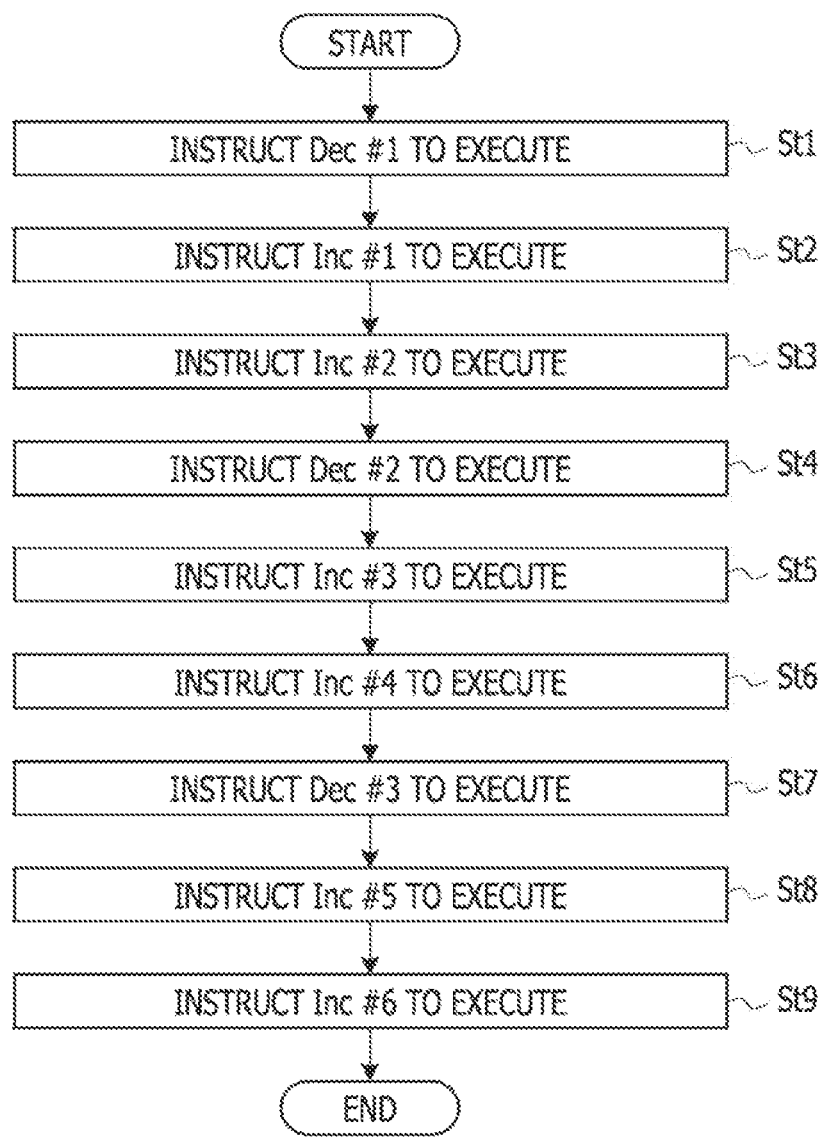
FIG. 9 is a diagram illustrating an example of processing of an execution instruction of a control operation from the monitoring control device to the control circuit.

FIG. 9 is a diagram illustrating an example of processing of an execution instruction of a control operation from the monitoring control device 4 to the control circuits Dec #1 to #3 and Inc #1 to #6. In this example, the monitoring control device 4 sequentially gives the execution instruction of the control operation to each of the control circuits Dec #1 to #3 and Inc #1 to #6. This processing is repeatedly executed at predetermined intervals.

First, the monitoring control device 4 instructs the control circuit Dec #1 to execute the control operation (operation St1). Next, the monitoring control device 4 instructs the control circuit Inc #1 to execute the control operation (operation St2). Then, the monitoring control device 4 instructs the control circuit Inc #2 to execute the control operation (operation St3).

Next, the monitoring control device 4 instructs the control circuit Dec #2 to execute the control operation (operation St4). Then, the monitoring control device 4 instructs the control circuit Inc #3 to execute the control operation (operation St5). Thereafter, the monitoring control device 4 instructs the control circuit Inc #4 to execute the control operation (operation St6).

Next, the monitoring control device 4 instructs the control circuit Dec #3 to execute the control operation (operation St7). Then, the monitoring control device 4 instructs the control circuit Inc #5 to execute the control operation (operation St8). Thereafter, the monitoring control device 4 instructs the control circuit Inc #6 to execute the control operation (operation St9).

Thus, the monitoring control device 4 serially instructs the control circuits Dec #1 to #3 and Inc #1 to #6 to execute the control operations for the preceding-stage demultiplexing circuit 11, the subsequent-stage demultiplexing circuit 12, and the subsequent-stage demultiplexing circuit 13 in this order. However, the order of the execution instructions for the control operations is not limited to this example.

Figure 10:
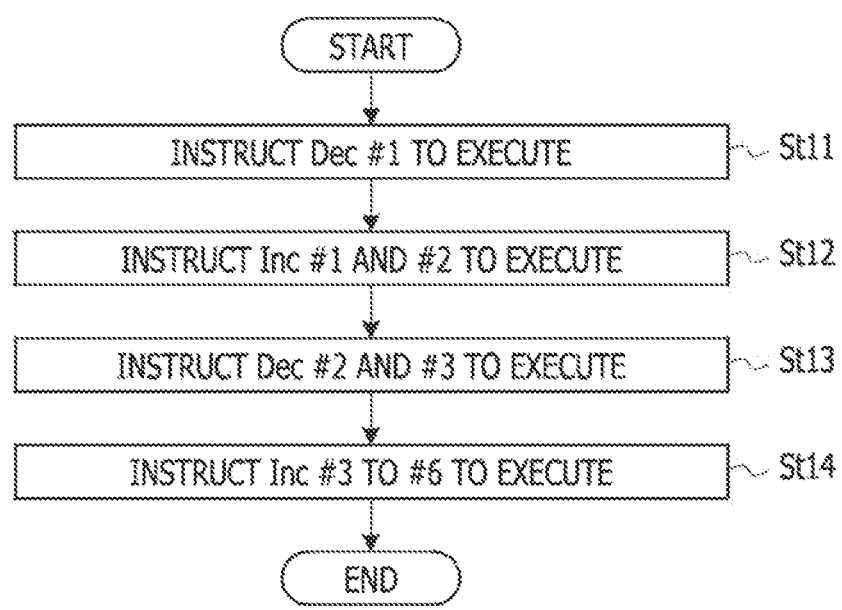
FIG. 10 is a diagram illustrating another example of processing of an execution instruction of a control operation from a monitoring control device 4 to the control circuit.

FIG. 10 is a diagram illustrating another example of processing of the execution instruction of the control operation from the monitoring control device 4 to the control circuits Dec #1 to #3 and Inc #1 to #6. In this example, the monitoring control device 4 concurrently instructs the execution instruction of the control operation to the control circuits Dec #1 to #3 and Inc #1 to #6 for each stage of the AMZs 1a to 1i to be controlled so as to move from the preceding stage to the subsequent stage in the multiple stages coupling of the AMZs 1a to 1i. This processing is repeatedly executed at predetermined intervals.

First, the monitoring control device 4 instructs the control circuit Dec #1 at the first stage to execute the control operation (operation St11). Next, the monitoring control device 4 instructs the control circuits Inc #1 and #2 in the subsequent stage of the control circuit Dec #1 to execute the control operations concurrently (operation St12).

Then, the monitoring control device 4 instructs the control circuits Dec #2 and #3 in the subsequent stage of the control circuits Inc #1 and #2 to execute the control operations (operation St13). Thereafter, the monitoring control device 4 instructs the control circuits Inc #3 to #6 in the subsequent stage of the control circuits Dec #2 and #3 to execute the control operations concurrently (operation St14).

Thus, the monitoring control device 4 serially instructs the control circuits Dec #1 to #3 and Inc #1 to #6 to execute the control operations for the preceding-stage demultiplexing circuit 11, the subsequent-stage demultiplexing circuit 12, and the subsequent-stage demultiplexing circuit 13 in this order.

Comparison of Embodiment and Comparative Example

Figure 11:
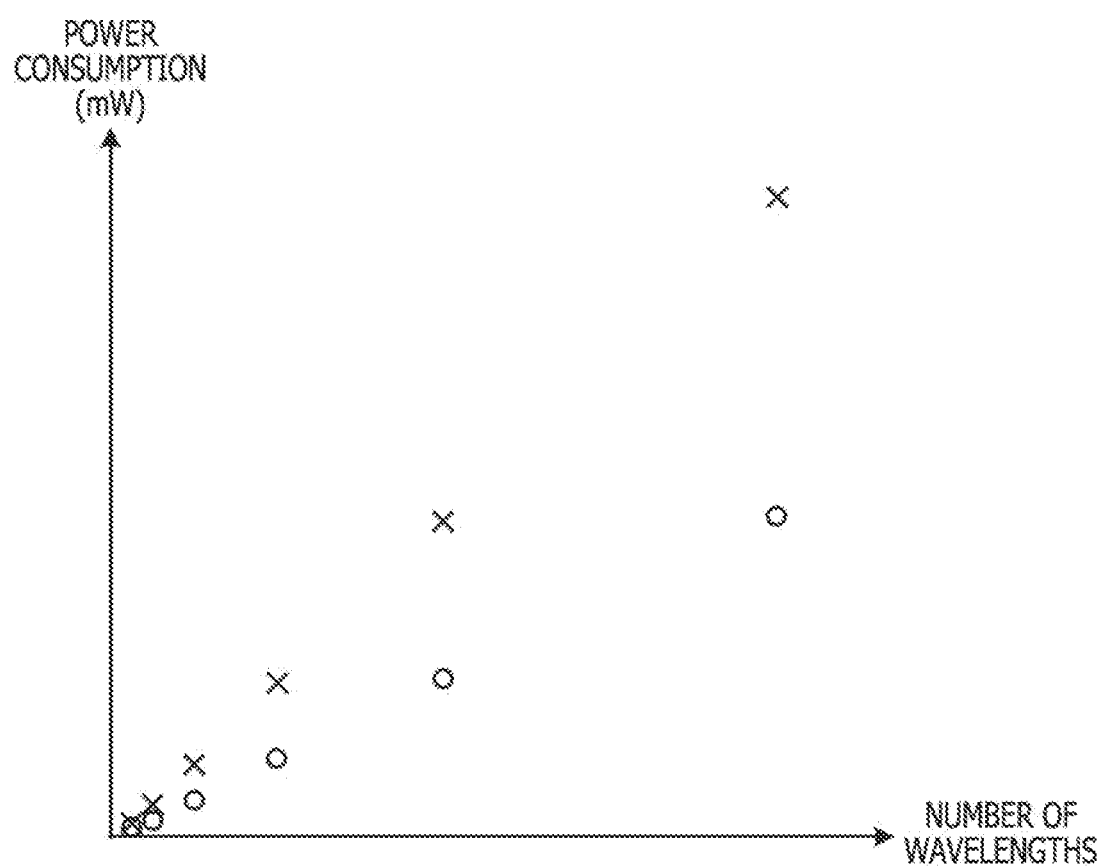
FIG. 11 is a diagram illustrating an example of changes in each power consumption of the optical demultiplexers of the embodiment and the comparative example with respect to the number of wavelengths.

FIG. 11 is a diagram illustrating an example of changes in the each power consumption of the optical demultiplexer 1 of the embodiment and the optical demultiplexers 8 and 9 of the comparative example with respect to the number of wavelengths. In FIG. 11, the horizontal axis represents the number of wavelengths of the signal lights Sa to Sd and the local oscillation lights La to Ld (four in the above example), and the vertical axis represents the power consumption (mW). The circles indicate the power consumption of the optical demultiplexer 1 of the embodiment, and the cross marks indicate the total power consumption of the optical demultiplexers 8 and 9 of the comparative example.

The number of the phase shifters Hu and Hd of the AMZs 1a to 1i in the optical demultiplexer 1 of the embodiment is half the number of the phase shifters Hu and Hd of the AMZs 8a to 8i and 9a to 9i in the optical demultiplexers 8 and 9 of the comparative example. Therefore, the power consumption of the optical demultiplexer 1 of the embodiment is about half the power consumption of the optical demultiplexers 8 and 9 of the comparative example. For example, the optical demultiplexer 1 of the embodiment may reduce the power consumption as compared with the optical demultiplexers 8 and 9 of the comparative example.

Figure 12:
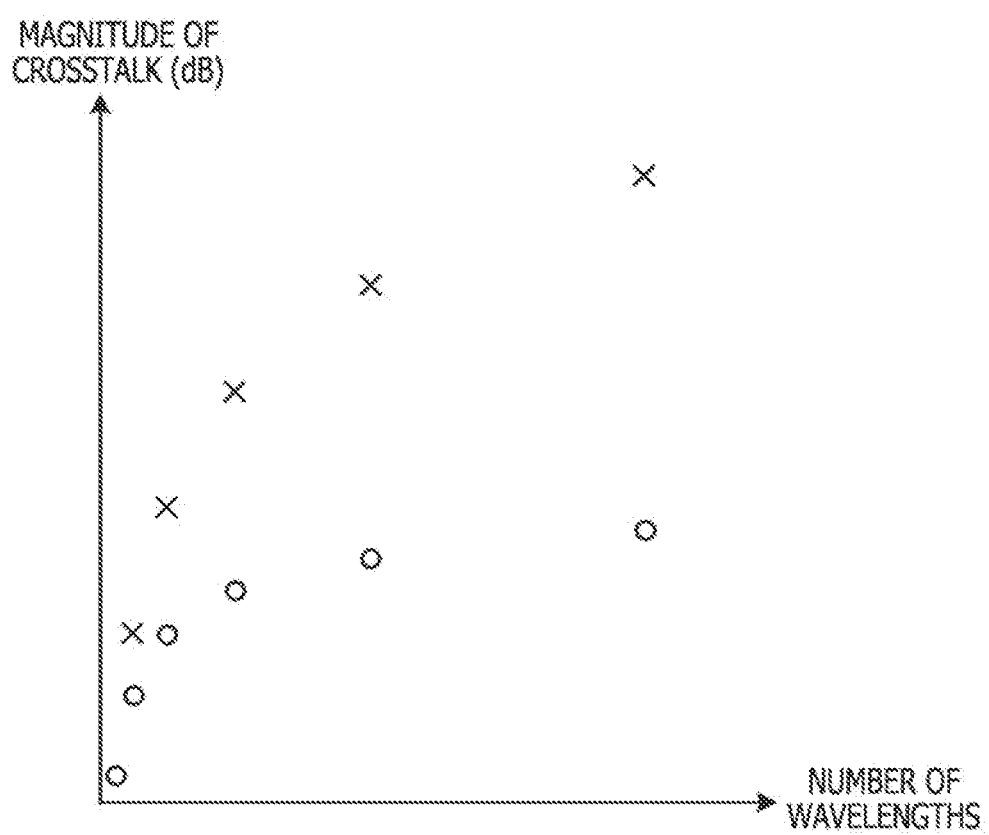
FIG. 12 is a diagram illustrating an example of changes in each crosstalk of the optical demultiplexers of the embodiment and the comparative example with respect to the number of wavelengths.

FIG. 12 is a diagram illustrating an example of changes with respect to the wavelength number of each crosstalk of the optical demultiplexer 1 of the embodiment and the optical demultiplexers 8 and 9 of the comparative example. In FIG. 12, the horizontal axis represents the number of wavelengths of the signal lights Sa to Sd and the local oscillation lights La to Ld (four in the above example), and the vertical axis represents the magnitude of crosstalk (dB). The circles indicate the magnitude of the crosstalk of the optical demultiplexer 1 of the embodiment, and the cross marks indicate the magnitude of the total crosstalk of the optical demultiplexers 8 and 9 of the comparative example.

When the number of wavelengths is four as in the above example, the optical demultiplexer 1 of the embodiment has only three intersections x1 to x3 of the waveguide, whereas the optical demultiplexers 8 and 9 of the comparative example has six intersections x in total. The larger the number of wavelengths, the larger the number of intersections and the magnitude of crosstalk. Therefore, as the number of wavelengths of the optical demultiplexer 1 of the embodiment is increased, the crosstalk may be reduced as compared with the optical demultiplexers 8 and 9 of the comparative example.

Figure 13:
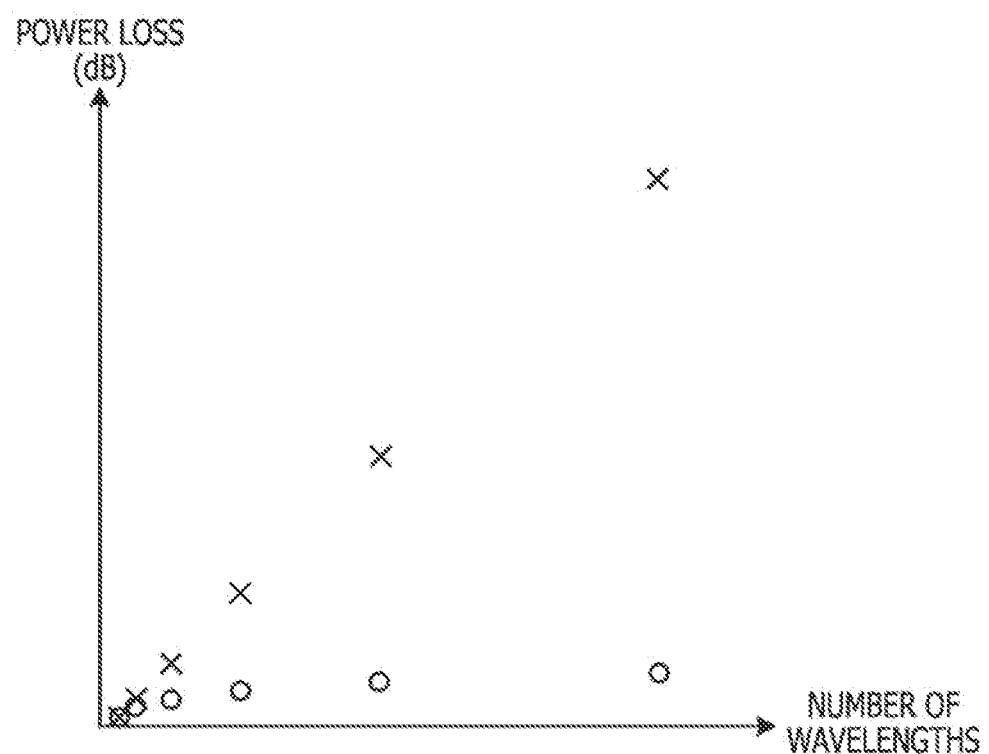
FIG. 13 is a diagram illustrating an example of changes in each power loss of the optical demultiplexers of the embodiment and the comparative example with respect to the number of wavelengths.

FIG. 13 is a diagram illustrating an example of changes with respect to the number of wavelengths of each power loss of the optical demultiplexer 1 of the embodiment and the optical demultiplexers 8 and 9 of the comparative example. In FIG. 13, the horizontal axis represents the number of wavelengths of the signal lights Sa to Sd and the local oscillation lights La to Ld (four in the above example), and the vertical axis represents the power loss (dB). The circles indicate the power loss of the optical demultiplexer 1 of the embodiment, and the cross marks indicate the total power loss of the optical demultiplexers 8 and 9 of the comparative example.

The larger the number of wavelengths, the larger the number of intersections and the magnitude of crosstalk. Therefore, as the number of wavelengths of the optical demultiplexer 1 of the embodiment is increased, the power loss may be reduced as compared with the optical demultiplexers 8 and 9 of the comparative example.

[Configurations of Other Control Circuits and Monitor Circuits]

The configurations of the control circuits Dec #1 to #3 and Inc #1 to #8 and the monitor circuits Mon #1 to #12 are not limited to those described above.

Figure 14:
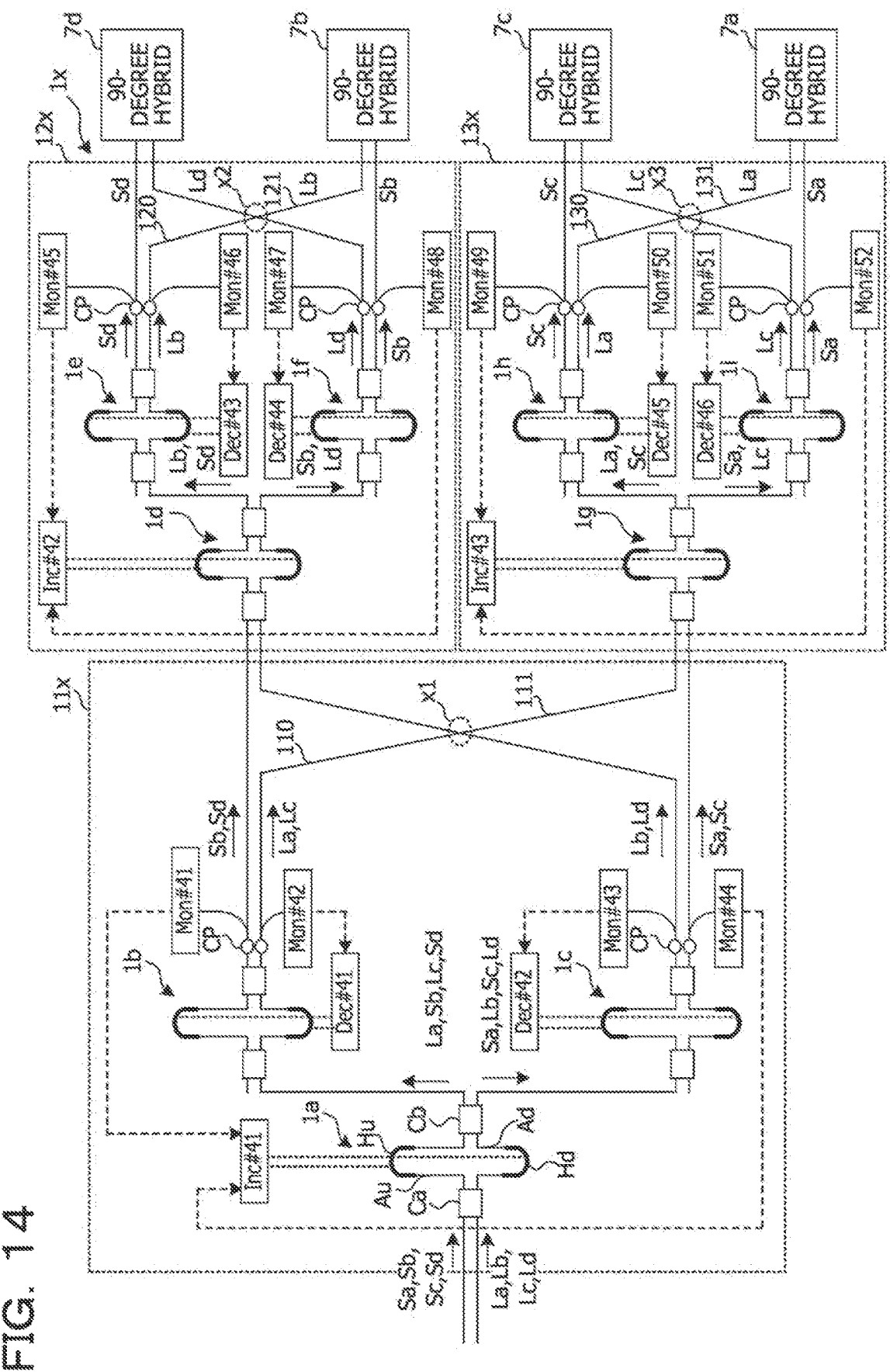
FIG. 14 is a configuration diagram illustrating an optical demultiplexer of another embodiment.

FIG. 14 is a configuration diagram illustrating an optical demultiplexer 1x of another embodiment. In FIG. 14, configurations common to those in FIG. 4 are denoted by the same reference numerals as those in FIG. 4 and description thereof is omitted.

The optical demultiplexer 1x has a preceding-stage demultiplexing circuit 11x, a subsequent-stage demultiplexing circuit 12x, and a subsequent-stage demultiplexing circuit 13x, which include AMZs 1a to 1i coupled in multiple stages as in the case of the optical demultiplexer 1. The preceding-stage demultiplexing circuit 11x, the subsequent-stage demultiplexing circuit 12x, and the subsequent-stage demultiplexing circuit 13x are examples of first to third optical processing units, respectively. The optical demultiplexer 1x has a configuration in which the arrangements of the control circuits Dec #1 to #3 and the control circuits Inc #1 to #8 in the optical demultiplexer 1 are interchanged.

The preceding-stage demultiplexing circuit 1ix includes control circuits Inc #41 to #44 and Dec #41 and #42, and monitor circuits Mon #41 to #44. The monitor circuit Mon #41 is an example of a first monitoring unit, which monitors the power of the signal lights Sb and Sd outputted from the AMZ 1b. The monitor circuit Mon #44 is an example of a second monitoring unit, which monitors the power of the signal lights Sa and Sc outputted from the AMZ 1c. The control circuit Inc #41 is an example of a first phase control unit, which controls the adjustment amount of the optical phase with respect to the phase shifters Hu and Hd of the AMZ 1a according to each of the monitoring results on the power of the signal lights Sb and Sd and the power of the signal lights Sa and Sc.

The monitor circuit Mon #42 is an example of a third monitoring unit, which monitors the power of the local oscillation lights La and Lc outputted from the AMZ 1b. The control circuit Dec #41 is an example of a second phase control unit, which controls the adjustment amount of the optical phase with respect to the phase shifters Hu and Hd of the AMZ 1b according to the monitoring result on the power of the local oscillation lights La and Lc.

The monitor circuit Mon #43 is an example of a fourth monitoring unit, which monitors the power of the local oscillation lights Lb and Ld outputted from the AMZ 1b. The control circuit Dec #42 is an example of a third phase control unit, which controls the adjustment amount of the optical phase with respect to the phase shifters Hu and Hd of the AMZ 1c according to the monitoring result on the power of the local oscillation lights Lb and Ld.

Thus, the optical demultiplexer 1 may appropriately control the powers of the signal lights Sa to Sd and the local oscillation lights La to Ld.

The subsequent-stage demultiplexing circuit 12x has control circuits Inc #42 and Dec #43 and #44 and monitor circuits Mon #45 to #48. The monitor circuit Mon #45 monitors the power of the signal light Sd outputted from the AMZ 1d. The monitor circuit Mon #48 monitors the power of the signal light Sb outputted from the AMZ 1f. The control circuit Inc #42 controls the adjustment amount of the optical phase with respect to the phase shifters Hu and Hd of the AMZ 1d according to each of the monitoring results on the power of the signal lights Sb and Sd.

The monitor circuit Mon #46 monitors the power of the local oscillation light Lb outputted from the AMZ 1e. The control circuit Dec #43 controls the adjustment amount of the optical phase with respect to the phase shifters Hu and Hd of the AMZ 1e according to the monitoring result on the power of the local oscillation light Lb.

The monitor circuit Mon #47 monitors the power of the local oscillation light Ld outputted from the AMZ 1f. The control circuit Dec #44 controls the adjustment amount of the optical phase with respect to the phase shifters Hu and Hd of the AMZ 1f according to the monitoring result on the power of the local oscillation light Ld.

The subsequent-stage demultiplexing circuit 13x has control circuits Inc #43 and Dec #45 and #46 and monitor circuits Mon #49 to #52. The monitor circuit Mon #49 monitors the power of the signal light Sc outputted from the AMZ 1h. The monitor circuit Mon #52 monitors the power of the signal light Sa outputted from the AMZ 1i. The control circuit Inc #43 controls the adjustment amount of the optical phase with respect to the phase shifters Hu and Hd of the AMZ 1g according to each of the monitoring results on the power of the signal lights Sc and Sa.

The monitor circuit Mon #50 monitors the power of the local oscillation light La outputted from the AMZ 1h. The control circuit Dec #45 controls the adjustment amount of the optical phase with respect to the phase shifters Hu and Hd of the AMZ 1h according to the monitoring result on the power of the local oscillation light La.

The monitor circuit Mon #51 monitors the power of the local oscillation light Lc outputted from the AMZ 1i. The control circuit Dec #46 controls the adjustment amount of the optical phase with respect to the phase shifters Hu and Hd of the AMZ 1i according to the monitoring result on the power of the local oscillation light Lc.

In this example, the monitor circuits Mon #41 to #52 notify only one of the control circuits Inc #41 to #43 and Dec #41 to #46 of the monitoring result on the power of the output light; however, the embodiments are not limited thereto, and the monitoring result on the power of the output light may be notified to two control circuits as in the following example.

Figure 15:
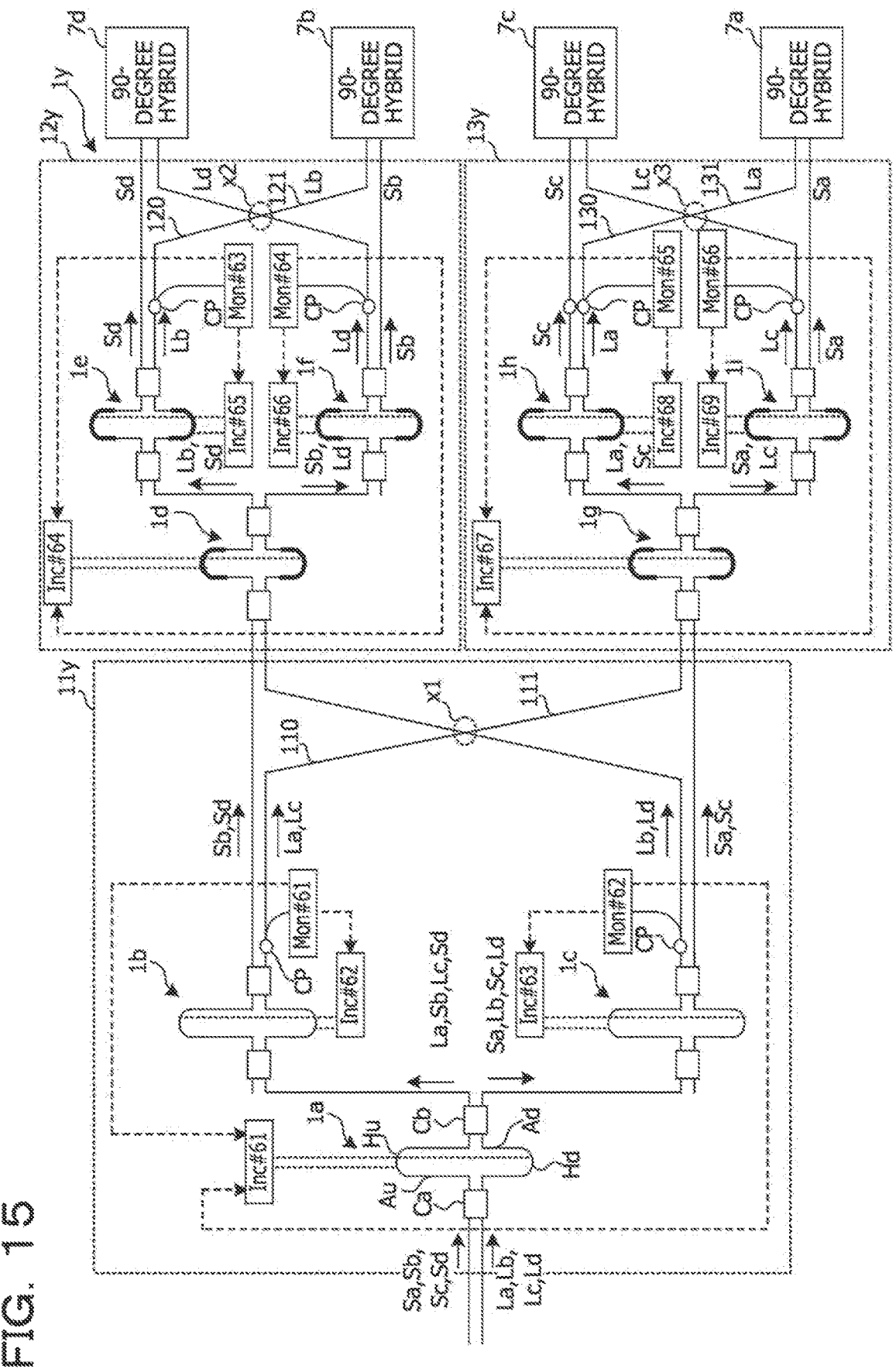
FIG. 15 is a configuration diagram illustrating an example of an optical demultiplexer in which a monitor circuit notifies two control circuits of a monitoring result.

FIG. 15 is a configuration diagram illustrating an example of an optical demultiplexer 1y in which the monitor circuits Mon #61 to #66 notify two of the control circuits Inc #61 to #69 of the monitoring results. In FIG. 15, configurations common to those in FIG. 4 are denoted by the same reference numerals as those in FIG. 4 and description thereof is omitted.

The optical demultiplexer 1y has a preceding-stage demultiplexing circuit 11y, a subsequent-stage demultiplexing circuit 12y, and a subsequent-stage demultiplexing circuit 13y, which include AMZs 1a to 1i coupled in multiple stages as in the case of the optical demultiplexer 1. The preceding-stage demultiplexing circuit 11y, the subsequent-stage demultiplexing circuit 12y, and the subsequent-stage demultiplexing circuit 13y are examples of the first to third optical processing units, respectively. The optical demultiplexer 1y has a configuration in which the monitor circuits Mon #61 to #66 notify two of the control circuits Inc #61 to #69 of the monitoring results.

The preceding-stage demultiplexing circuit 11y has control circuits Inc #61 to #63 and monitor circuits Mon #61 and #62. The monitor circuit Mon #61 is an example of a fifth monitoring unit, which monitors the power of the local oscillation lights La and Lc outputted from the AMZ 1b to the subsequent-stage demultiplexing circuit 13y. The monitor circuit Mon #61 notifies the control circuits Inc #61 and #62 of the monitoring results on the power of the local oscillation lights La and Lc, respectively. The monitor circuit Mon #62 is an example of a sixth monitoring unit, which monitors the power of the local oscillation lights Lb and Ld outputted from the AMZ 1c to the subsequent-stage demultiplexing circuit 12y. The monitor circuit Mon #62 notifies the control circuits Inc #61 and #63 of the monitoring results on the power of the local oscillation lights Lb and Ld, respectively.

The control circuit Inc #61 is an example of a sixth phase control unit, which controls the adjustment amount of the optical phase with respect to the phase shifters Hu and Hd of the AMZ 1a according to each of the monitoring results on the power of the local oscillation lights La and Lc and the power of the local oscillation lights Lb and Ld. The control circuit Inc #62 is an example of a fourth phase control unit, which controls the adjustment amount of the optical phase with respect to the phase shifters Hu and Hd of the AMZ 1b according to the monitoring result on the power of the local oscillation lights La and Lc. The control circuit Inc #63 is an example of a fifth phase control unit, which controls the adjustment amount of the optical phase with respect to the phase shifters Hu and Hd of the AMZ 1c according to the monitoring result on the power of the local oscillation lights Lb and Ld.

With this configuration, the number of the monitor circuits Mon #61 and #62 is reduced as compared with the preceding-stage demultiplexing circuit 11 in the optical demultiplexer 1 illustrated in FIG. 4.

The subsequent-stage demultiplexing circuit 12y has control circuits Inc #64 to #66 and monitor circuits Mon #63 and #64. The monitor circuit Mon #63 monitors the power of the local oscillation light Lb outputted from the AMZ 1e. The monitor circuit Mon #63 notifies the control circuits Inc #64 and #65 of the monitoring result on the power of the local oscillation light Lb, respectively. The monitor circuit Mon #64 monitors the power of the local oscillation light Ld outputted from the AMZ 1f. The monitor circuit Mon #64 notifies the control circuits Inc #64 and #66 of the monitoring result on the power of the local oscillation light Ld, respectively.

The control circuit Inc #64 controls the adjustment amount of the optical phase with respect to the phase shifters Hu and Hd of the AMZ 1d according to each of the monitoring results on the power of the local oscillation light Lb and the power of the local oscillation light Ld. The control circuit Inc #65 controls the adjustment amount of the optical phase with respect to the phase shifters Hu and Hd of the AMZ 1e according to the monitoring result on the power of the local oscillation light Lb. The control circuit Inc #66 controls the adjustment amount of the optical phase with respect to the phase shifters Hu and Hd of the AMZ 1f according to the monitoring result on the power of the local oscillation light Ld.

With this configuration, the number of the monitor circuits Mon #63 and #64 is reduced as compared with the subsequent-stage demultiplexing circuit 12 in the optical demultiplexer 1 illustrated in FIG. 4.

The subsequent-stage demultiplexing circuit 13y has control circuits Inc #67 to #69 and monitor circuits Mon #65 and #66. The monitor circuit Mon #65 monitors the power of the local oscillation light La outputted from the AMZ 1h. The monitor circuit Mon #65 notifies the control circuits Inc #67 and #68 of the monitoring result on the power of the local oscillation light La, respectively. The monitor circuit Mon #66 monitors the power of the local oscillation light Lc outputted from the AMZ 1i. The monitor circuit Mon #66 notifies the control circuits Inc #67 and #69 of the monitoring result on the power of the local oscillation light Ld, respectively.

The control circuit Inc #67 controls the adjustment amount of the optical phase with respect to the phase shifters Hu and Hd of the AMZ 1g according to each of the monitoring results on the power of the local oscillation light La and the power of the local oscillation light Lc. The control circuit Inc #68 controls the adjustment amount of the optical phase with respect to the phase shifters Hu and Hd of the AMZ 1h according to the monitoring result on the power of the local oscillation light La. The control circuit Inc #69 controls the adjustment amount of the optical phase with respect to the phase shifters Hu and Hd of the AMZ 1i according to the monitoring result on the power of the local oscillation light Lc.

With this configuration, the number of the monitor circuits Mon #65 and #66 is reduced as compared with the subsequent-stage demultiplexing circuit 12 in the optical demultiplexer 1 illustrated in FIG. 4.

Therefore, the optical demultiplexer 1y of this example may be made smaller than the optical demultiplexer 1 illustrated in FIG. 4.

Figure 16:
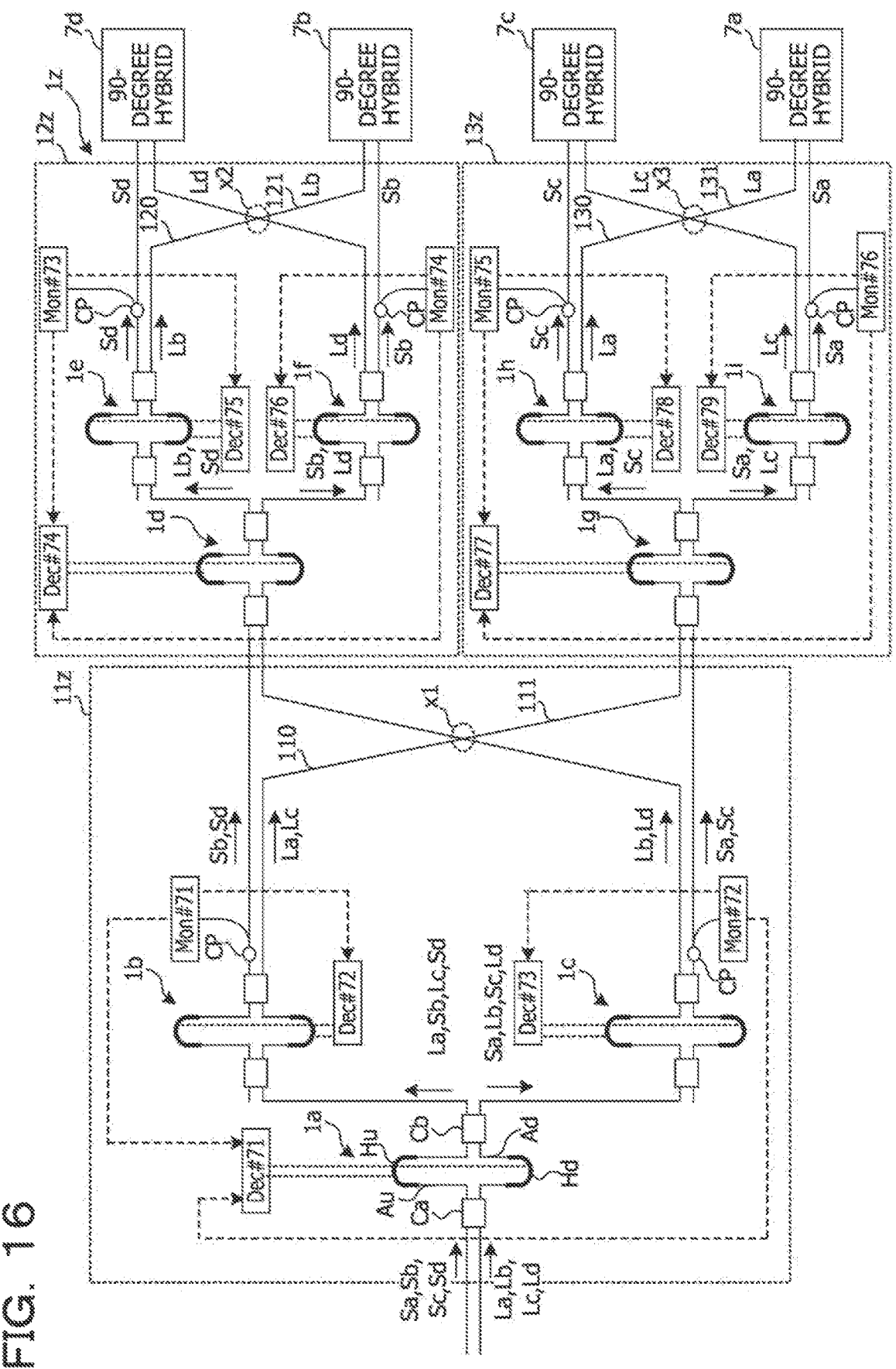
FIG. 16 is a configuration diagram illustrating another example of an optical demultiplexer in which a monitor circuit notifies two control circuits of a monitoring result.

FIG. 16 is a configuration diagram illustrating another example of an optical demultiplexer 1z in which monitor circuits Mon #71 to #76 notify two of control circuits Dec #71 to #79 of the monitoring results. In FIG. 16, configurations common to those in FIG. 4 are denoted by the same reference numerals as those in FIG. 4 and description thereof is omitted.

The optical demultiplexer 1z has a preceding-stage demultiplexing circuit 11z, a subsequent-stage demultiplexing circuit 12z, and a subsequent-stage demultiplexing circuit 13z, which include AMZs 1a to 1i coupled in multiple stages as in the case of the optical demultiplexer 1. The preceding-stage demultiplexing circuit 11z, the subsequent-stage demultiplexing circuit 12z, and the subsequent-stage demultiplexing circuit 13z are examples of the first to third optical processing units, respectively. The optical demultiplexer 1z has a configuration in which the monitor circuits Mon #71 to #76 notify two of the control circuits Dec #71 to #79 of the monitoring results.

The preceding-stage demultiplexing circuit 11z has control circuits Dec #71 to #73 and monitor circuits Mon #71 and #72. The monitor circuit Mon #71 is an example of a seventh monitoring unit, which monitors the power of the signal lights Sb and Sd outputted from the AMZ 1b to the subsequent-stage demultiplexing circuit 12z. The monitor circuit Mon #71 notifies the control circuits Dec #71 and #72 of the monitoring results on the power of the signal lights Sb and Sd, respectively. The monitor circuit Mon #72 is an example of an eighth monitoring unit, which monitors the power of the signal lights Sa and Sc outputted from the AMZ 1c to the subsequent-stage demultiplexing circuit 13z. The monitor circuit Mon #72 notifies the control circuits Dec #71 and #73 of the monitoring results on the power of the signal lights Sa and Sc, respectively.

The control circuit Dec #71 is an example of a ninth phase control unit, which controls the adjustment amount of the optical phase with respect to the phase shifters Hu and Hd of the AMZ 1b according to each of the monitoring results on the power of the signal lights Sb and Sd and the power of the signal lights Sa and Sc. The control circuit Dec #72 is an example of a seventh phase control unit, which controls the adjustment amount of the optical phase with respect to the phase shifters Hu and Hd of the AMZ 1b according to the monitoring result on the power of the signal lights Sb and Sd. The control circuit Dec #73 is an example of an eighth phase control unit, which controls the adjustment amount of the optical phase with respect to the phase shifters Hu and Hd of the AMZ 1c according to the monitoring result on the power of the signal lights Sa and Sc.

With this configuration, the number of the monitor circuits Mon #71 and #72 is reduced as compared with the preceding-stage demultiplexing circuit 11 in the optical demultiplexer 1 illustrated in FIG. 4.

The subsequent-stage demultiplexing circuit 12z has control circuits Dec #74 to #76 and monitor circuits Mon #73 and #74. The monitor circuit Mon #73 monitors the power of the signal light Sd outputted from the AMZ 1e. The monitor circuit Mon #73 notifies the control circuits Dec #74 and #75 of the monitoring result on the power of the signal light Sd, respectively. The monitor circuit Mon #74 monitors the power of the signal light Sb outputted from the AMZ 1f to the subsequent-stage demultiplexing circuit 12z. The monitor circuit Mon #74 notifies the control circuits Dec #74 and #76 of the monitoring result on the power of the signal light Sb, respectively.

The control circuit Dec #74 controls the adjustment amount of the optical phase with respect to the phase shifters Hu and Hd of the AMZ 1d according to each of the monitoring results on the power of the signal light Sd and the power of the signal light Sb. The control circuit Dec #75 controls the adjustment amount of the optical phase with respect to the phase shifters Hu and Hd of the AMZ 1e according to the monitoring result on the power of the signal light Sd. The control circuit Dec #76 controls the adjustment amount of the optical phase with respect to the phase shifters Hu and Hd of the AMZ 1f according to the monitoring result on the power of the signal light Sb.

With this configuration, the number of the monitor circuits Mon #73 and #74 is reduced as compared with the subsequent-stage demultiplexing circuit 12 in the optical demultiplexer 1 illustrated in FIG. 4.

The subsequent-stage demultiplexing circuit 13z includes control circuits Dec #77 to #79 and monitor circuits Mon #75 and #76. The monitor circuit Mon #75 monitors the power of the signal light Sc outputted from the AMZ 1h. The monitor circuit Mon #75 notifies the control circuits Dec #77 and #78 of the monitoring result on the power of the signal light Sc, respectively. The monitor circuit Mon #76 monitors the power of the signal light Sa outputted from the AMZ 1i.

The monitor circuit Mon #76 notifies the control circuits Dec #77 and #79 of the monitoring result on the power of the signal light Sa, respectively.

The control circuit Dec #77 controls the adjustment amount of the optical phase with respect to the phase shifters Hu and Hd of the AMZ 1g according to each of the monitoring results on the power of the signal light Sc and the power of the signal light Sa. The control circuit Dec #78 controls the adjustment amount of the optical phase with respect to the phase shifters Hu and Hd of the AMZ 1h according to the monitoring result on the power of the signal light Sc. The control circuit Dec #79 controls the adjustment amount of the optical phase with respect to the phase shifters Hu and Hd of the AMZ 1i according to the monitoring result on the power of the signal light Sa.

With this configuration, the number of the monitor circuits Mon #75 and #76 is reduced as compared with the subsequent-stage demultiplexing circuit 12 in the optical demultiplexer 1 illustrated in FIG. 4.

Therefore, the optical demultiplexer 1z of this example may be made smaller than the optical demultiplexer 1 illustrated in FIG. 4.

[Optical Demultiplexer with Spectrum Shaping Function]

Figure 17:
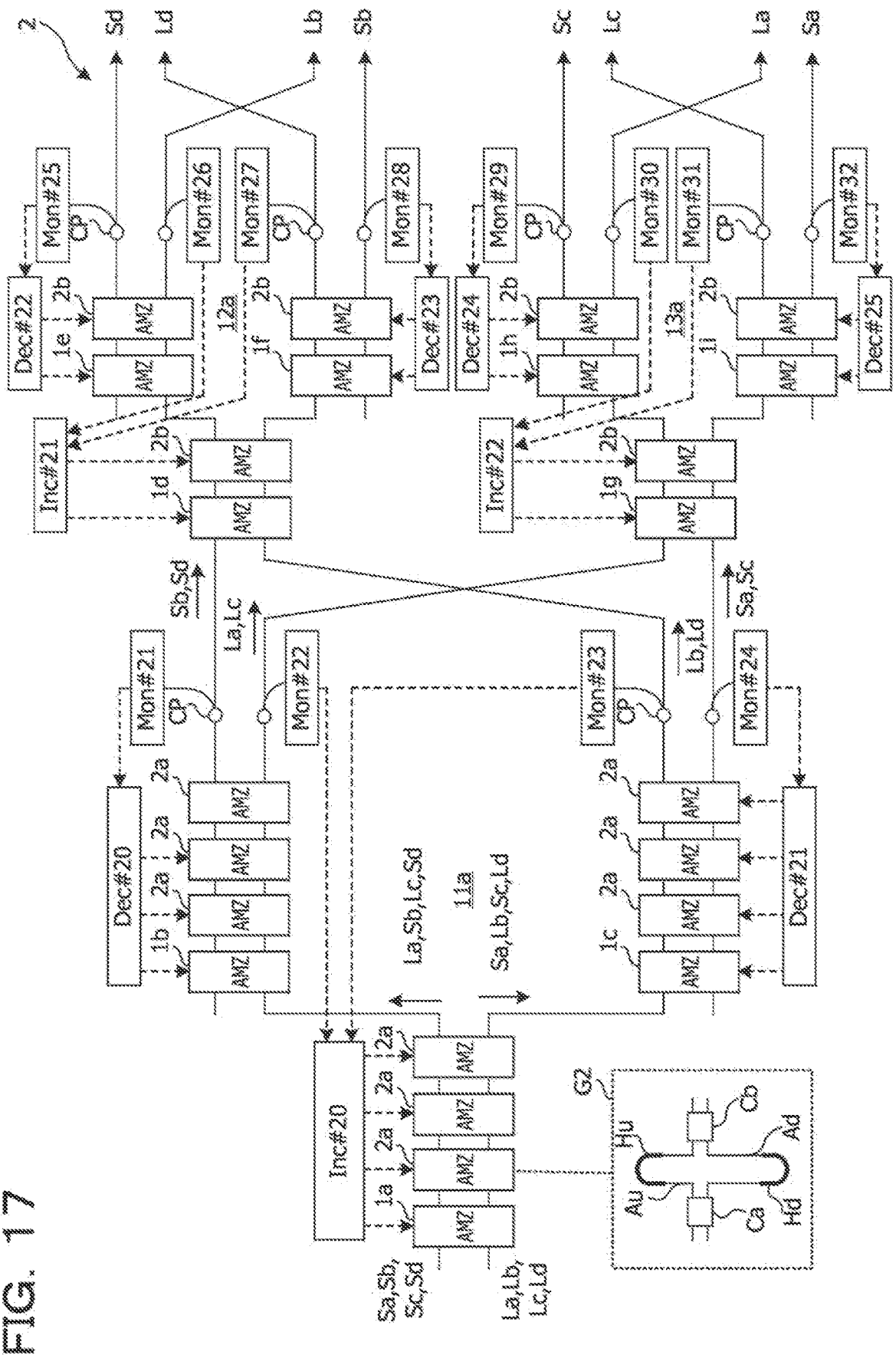
FIG. 17 is a configuration diagram illustrating an example of an optical demultiplexer having a spectrum shaping function.

FIG. 17 is a configuration diagram illustrating an example of an optical demultiplexer 2 with a spectrum shaping function. In FIG. 17, configurations common to those in FIG. 4 are denoted by the same reference numerals as those in FIG. 4 and description thereof is omitted.

The optical demultiplexer 2 has a preceding-stage demultiplexing circuit 11a, a subsequent-stage demultiplexing circuit 12a, and a subsequent-stage demultiplexing circuit 13a, which include AMZs 1a to 1i coupled in multiple stages as in the case of the optical demultiplexer 1. The preceding-stage demultiplexing circuit 11a has three AMZs 2a optically coupled in the subsequent stages of each of the AMZs 1a to 1c. The subsequent-stage demultiplexing circuit 12 has AMZs 2b optically coupled in the subsequent stage of each of the AMZs 1d to 1f, and the subsequent-stage demultiplexing circuit 13 has AMZs 2b optically coupled in the subsequent stage of each of the AMZs 1g to 1i.

The AMZs 2a and 2b have the same configuration as the AMZs 1a to 1i as indicated by reference numeral G, but the arm length difference of the AMZs 2a is larger than that of the AMZs 2b.

The three AMZs 2a in the subsequent stage of each of the AMZs 1a to 1c are an example of the shaping unit, which shape the spectrum of the output light from the AMZs 1a to 1c. The three AMZs 2a may be provided in any one of the AMZs 1a to 1c.

The preceding-stage demultiplexing circuit 11a has monitor circuits Mon #21 to #24 and control circuits Inc #20 and Dec #20 and #21. The monitor circuit Mon #21 monitors the power of the signal lights Sb and Sd outputted from the AMZ 1b and the subsequent-stage AMZ 2a, and notifies the control circuit Dec #20 of the monitoring result. The control circuit Dec #20 controls the adjustment amount of the optical phases in the pair of arms Au and Ad with respect to each of the phase shifters Hu and Hd of the AMZ 1b and the AMZ 2a in the subsequent stage according to the monitoring result on the power of the signal lights Sb and Sd.

The monitor circuit Mon #24 monitors the power of the signal lights Sa and Sc outputted from the AMZ 1c and the AMZ 2a in the subsequent stage, and notifies the control circuit Dec #21 of the monitoring result. The control circuit Dec #21 controls the adjustment amount of the optical phases in the pair of arms Au and Ad with respect to each of the phase shifters Hu and Hd of the AMZ 1c and the AMZ 2a in the subsequent stage according to the monitoring result on the power of the signal lights Sa and Sc.

The monitor circuit Mon #22 monitors the power of the local oscillation lights La and Lc outputted from the AMZ 1b and the AMZ 2a in the subsequent stage, and notifies the control circuit Inc #20 of the monitoring result. The monitor circuit Mon #23 monitors the power of the local oscillation lights Lb and Ld outputted from the AMZ 1c and the AMZ 2a in the subsequent stage, and notifies the control circuit Inc #20 of the monitoring result. The control circuit Inc #20 controls the adjustment amount of the optical phases in the pair of arms Au and Ad with respect to each of the phase shifters Hu and Hd of the AMZ 1a and the AMZ 2a in the subsequent stage according to each of the monitoring results on the power of the local oscillation lights La and Lc and the power of the local oscillation lights Lb and Ld.

With this configuration, the three AMZs 2a in the subsequent stage of each of the AMZs 1a to 1c may shape the spectrum so that each spectrum is flattened by filtering the signal lights Sa to Sd and the local oscillation lights La to Ld.

The AMZ 2b in the subsequent stage of each of the AMZs 1d to 1i also shapes the spectrum of the output light from the AMZs 1d to 1i.

The subsequent-stage demultiplexing circuit 12a has monitor circuits Mon #25 to #28 and control circuits Inc #21 and Dec #22 and #23. The monitor circuit Mon #25 monitors the power of the signal light Sd outputted from the AMZ 1e and the AMZ 2b in the subsequent stage, and notifies the control circuit Dec #22 of the monitoring result. The control circuit Dec #22 controls the adjustment amount of the optical phase in the pair of arms Au and Ad with respect to each of the phase shifters Hu and Hd of the AMZ 1e and the AMZ 2b in the subsequent stage according to the monitoring result on the power of the signal light Sd.

The monitor circuit Mon #28 monitors the power of the signal light Sb outputted from the AMZ 1f and the AMZ 2b in the subsequent stage, and notifies the control circuit Dec #23 of the monitoring result. The control circuit Dec #23 controls the adjustment amount of the optical phase in the pair of arms Au and Ad with respect to each of the phase shifters Hu and Hd of the AMZ 1f and the AMZ 2b in the subsequent stage according to the monitoring result on the power of the signal light Sb.

The monitor circuit Mon #26 monitors the power of the local oscillation light Lb outputted from the AMZ 1e and the AMZ 2b in the subsequent stage, and notifies the control circuit Inc #21 of the monitoring result. The monitor circuit Mon #27 monitors the power of the local oscillation light Ld outputted from the AMZ 1f and the AMZ 2b in the subsequent stage, and notifies the control circuit Inc #21 of the monitoring result. The control circuit Inc #21 controls the adjustment amount of the optical phase in the pair of arms Au and Ad with respect to each of the phase shifters Hu and Hd of the AMZ 1d and the AMZ 2b in the subsequent stage according to each of the monitoring results on the power of the local oscillation light Lb and the power of the local oscillation light Ld.

With this configuration, the AMZ 2b in the subsequent stage of each of the AMZs 1d to 1f may shape the spectrum so that each spectrum is flattened by filtering the signal lights Sb and Sd and the local oscillation lights Lb and Ld.

The subsequent-stage demultiplexing circuit 12c has monitor circuits Mon #29 to #32 and control circuits Inc #22 and Dec #24 and #25. The monitor circuit Mon #29 monitors the power of the signal light Sc outputted from the AMZ 1h and the AMZ 2b in the subsequent stage, and notifies the control circuit Dec #24 of the monitoring result. The control circuit Dec #24 controls the adjustment amount of the optical phase in the pair of arms Au and Ad with respect to each of the phase shifters Hu and Hd of the AMZ 1h and the AMZ 2b in the subsequent stage according to the monitoring result on the power of the signal light Sc.

The monitor circuit Mon #32 monitors the power of the signal light Sa outputted from the AMZ 1i and the AMZ 2b in the subsequent stage, and notifies the control circuit Dec #25 of the monitoring result. The control circuit Dec #25 controls the adjustment amount of the optical phase in the pair of arms Au and Ad with respect to each of the phase shifters Hu and Hd of the AMZ 1i and the AMZ 2b in the subsequent stage according to the monitoring result on the power of the signal light Sa.

The monitor circuit Mon #30 monitors the power of the local oscillation light La outputted from the AMZ 1h and the AMZ 2b in the subsequent stage, and notifies the control circuit Inc #22 of the monitoring result. The monitor circuit Mon #31 monitors the power of the local oscillation light Lc outputted from the AMZ 1i and the AMZ 2b in the subsequent stage, and notifies the control circuit Inc #22 of the monitoring result. The control circuit Inc #22 controls the adjustment amount of the optical phase in the pair of arms Au and Ad with respect to each of the phase shifters Hu and Hd of the AMZ 1g and the AMZ 2b in the subsequent stage according to each of the monitoring results on the power of the local oscillation light La and the power of the local oscillation light Lc.

With this configuration, the AMZ 2b in the subsequent stage of each of the AMZs 1g to 1i may shape the spectrum so that each spectrum is flattened by filtering the signal lights Sa and Sc and the local oscillation lights La and Lc.

The optical demultiplexer 2 of this example may improve the quality of the signal lights Sa to Sd and the local oscillation lights La to Ld as compared with the optical demultiplexer 1 illustrated in FIG. 4.

The spectrum shaping is not limited to the example described above, and may be realized by coupling a ring resonator to each of the AMZs 1a to 1i, for example.

Figure 18:
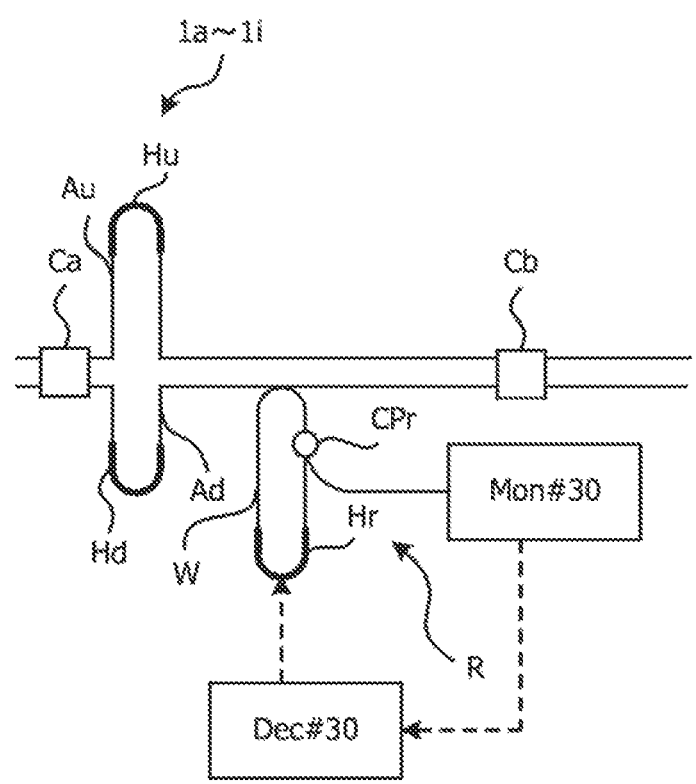
FIG. 18 is a diagram illustrating an example of a configuration in which a ring resonator is coupled to an asymmetric Mach-Zehnder interferometer.

FIG. 18 is a diagram illustrating an example of a configuration in which a ring resonator R is coupled to each of the AMZs 1a to 1i. The ring resonator R is optically coupled to the waveguide between the lower arm Ad of each of the AMZs 1a to 1i and the output coupler Cb.

The ring resonator R includes: a ring-shaped waveguide W coupled to the waveguides of the AMZs 1a to 1i; a phase shifter Hr provided in the waveguide W; a monitor circuit Mon #30 that monitors the power of light transmitted through the waveguide W; a coupler CPr that demultiplexes the light from the waveguide W to the monitor circuit Mon #30; and a control circuit Dec #30 that controls the phase shifter Hr. The monitor circuit Mon #30 notifies the control circuit Dec #30 of the monitoring result on the power of the light. The control circuit Dec #30 controls the adjustment amount of the optical phase in the waveguide W according to the monitoring result on the power of the light with respect to the phase shifter Hr. The phase shifter Hr is realized by a heater, for example, as in the case of the phase shifters Hu and Hd.

With this configuration, the ring resonator R may shape the spectra so that each spectrum is flattened by filtering the signal lights Sa to Sd and the local oscillation lights La to Ld outputted from the AMZs 1a to 1i. The ring resonator R is an example of a shaping unit.

[Optical Demultiplexer Compatible with Eight Wavelengths]

Although the optical demultiplexers 1, 1x to 1z, and 2 compatible with four wavelengths (the number of wavelengths=4) have been described above, the number of wavelengths is not limited to four.

Figure 19:
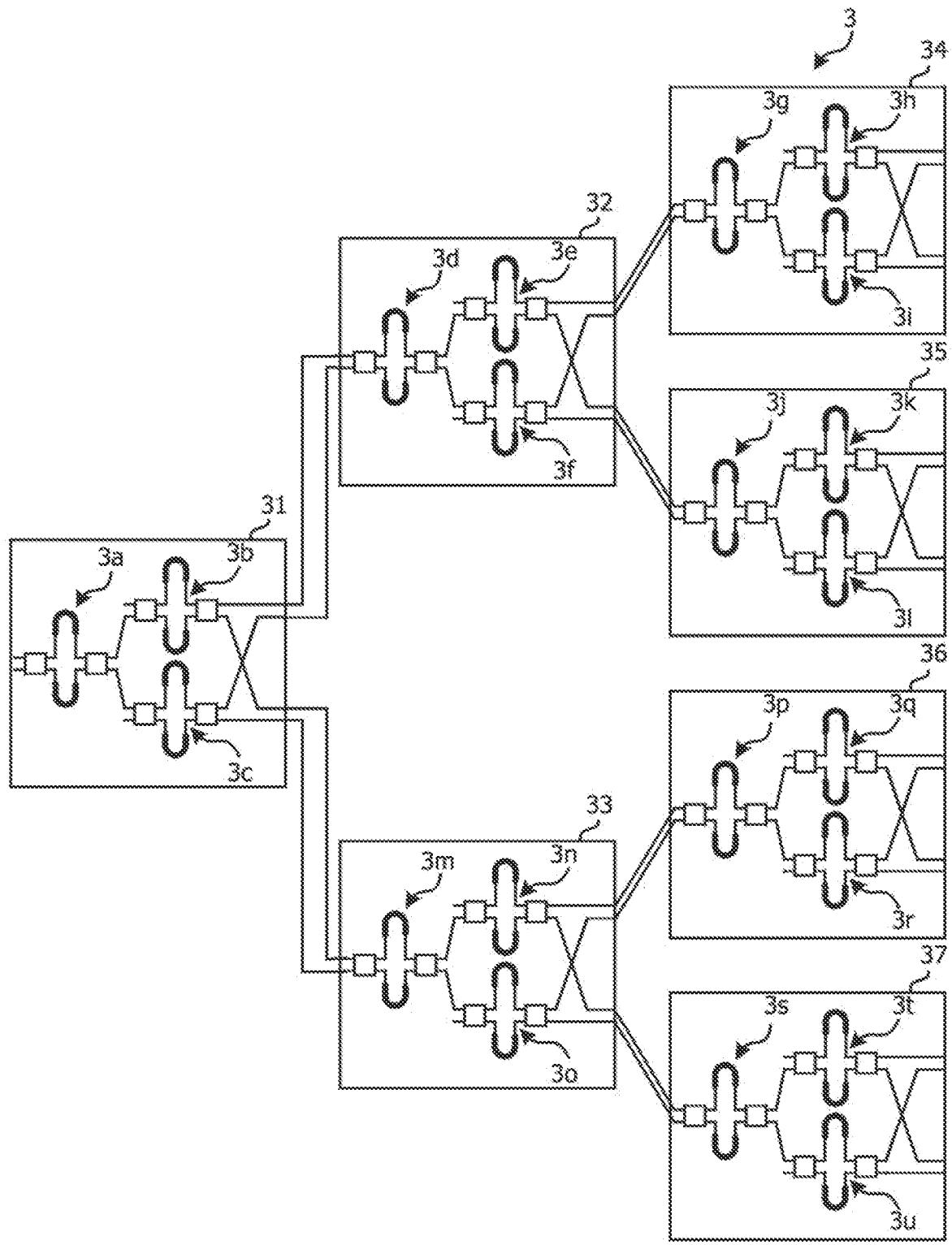
FIG. 19 is a configuration diagram illustrating an example of an optical demultiplexer corresponding to eight wavelengths.

FIG. 19 is a configuration diagram illustrating an example of an optical demultiplexer 3 compatible with eight wavelengths. The optical demultiplexer 3 has a preceding-stage demultiplexing circuit 31, a middle-stage demultiplexing circuit 32, and subsequent-stage demultiplexing circuits 34 to 37, which are coupled in multiple stages in a tree shape. In FIG. 19, the illustration of the monitor circuit and the control circuit related to the control of the phase shifters Hu and Hd is omitted.

The preceding-stage demultiplexing circuit 31, the middle-stage demultiplexing circuit 32, and the subsequent-stage demultiplexing circuits 34 to 37 include AMZs 3a to 3u, respectively, each including three AMZs, which are coupled in a tree shape, as in the case of the preceding-stage demultiplexing circuit 11 and the subsequent-stage demultiplexing circuits 12 and 13 in the optical demultiplexer 1. The preceding-stage demultiplexing circuit 31 includes the AMZs 3a to 3c, the middle-stage demultiplexing circuit 32 includes the AMZs 3d to 3f, and the middle-stage demultiplexing circuit 33 includes the AMZs 3m to 3o. The subsequent-stage demultiplexing circuit 34 includes the AMZs 3g to 3i, and the subsequent-stage demultiplexing circuit 35 includes the AMZs 3j to 3l. The subsequent-stage demultiplexing circuit 36 includes the AMZs 3p to 3r, and the subsequent-stage demultiplexing circuit 37 includes the AMZs 3s to 3u. The preceding-stage demultiplexing circuit 31 is an example of the first optical processing unit, and the middle-stage demultiplexing circuit 32 and the subsequent-stage demultiplexing circuits 34 and 35 are an example of the second optical processing unit, and the middle-stage demultiplexing circuit 33 and the subsequent-stage demultiplexing circuits 36 and 37 are an example of the third optical processing unit.

A pair of output ports of the AMZ 3a are optically coupled to the AMZs 3b and 3c, respectively. A pair of output ports of the AMZs 3b and 3c are optically coupled to the AMZs 3d and 3m. The AMZs 3b and 3c are coupled to the AMZs 3d and 3m by crossing a waveguide extending from one of the output ports.

A pair of output ports of the AMZ 3d are optically coupled to the AMZs 3e and 3f, respectively. A pair of output ports of the AMZs 3e and 3f are optically coupled to the AMZs 3g and 3j. The AMZs 3e and 3f are coupled to the AMZs 3g and 3j by crossing a waveguide extending from one of the output ports.

A pair of output ports of the AMZ 3g are optically coupled to the AMZs 3h and 3i, respectively. A pair of output ports of the AMZs 3h and 3i are optically coupled to 90-degree hybrid circuits (not illustrated). The AMZs 3h and 3i are coupled to the 90-degree hybrid circuits by crossing a waveguide extending from one of the output ports.

A pair of output ports of the AMZ 3j are optically coupled to the AMZs 3k and 3l, respectively. A pair of output ports of the AMZs 3k and 3l are optically coupled to 90-degree hybrid circuits (not illustrated). The AMZs 3k and 3l are coupled to the 90-degree hybrid circuit by crossing a waveguide extending from one of the output ports.

A pair of output ports of the AMZ 3m are optically coupled to the AMZs 3n and 3o, respectively. A pair of output ports of the AMZs 3n and 3o are optically coupled to the AMZs 3p and 3s, respectively. The AMZs 3n and 3o are coupled to the AMZs 3p and 3s by crossing a waveguide extending from one of the output ports.

A pair of output ports of the AMZ 3p are optically coupled to the AMZs 3q and 3r, respectively. A pair of output ports of the AMZs 3q and 3r are optically coupled to 90-degree hybrid circuits (not illustrated). The AMZs 3q and 3r are coupled to the 90-degree hybrid circuits by crossing a waveguide extending from one of the output ports.

A pair of output ports of the AMZ 3s are optically coupled to the AMZs 3t and 3u, respectively. A pair of output ports of the AMZs 3t and 3u are optically coupled to 90-degree hybrid circuits (not illustrated). The AMZs 3t and 3u are coupled to the 90-degree hybrid circuits by crossing a waveguide extending from one of the output ports.

With the above configuration, the optical demultiplexer 3 may also demultiplex signal light and local oscillation light having eight wavelengths, and input the signal light and local oscillation light having the same center wavelength to the same 90-degree hybrid circuit. The preceding-stage demultiplexing circuit 31, the middle-stage demultiplexing circuit 32, and the subsequent-stage demultiplexing circuits 34 to 37 are coupled over three stages according to the number of wavelengths ($8=2^3$) of the signal light and the local oscillation light. Generally speaking, when the number of wavelengths is N (an integer of 3 or more), the number of stages is N, and thus the middle-stage demultiplexing circuit 32 and the subsequent-stage demultiplexing circuits 34 to 37 each has a configuration in which sets of three AMZs 3d to 3f, 3g to 3i, 3j to 3l, 3m to 3o, 3p to 3r, and 3s to 3u are coupled across (N−1) stages.

[Application to Polarization Multiplexed Light Transmission]

Figure 20:
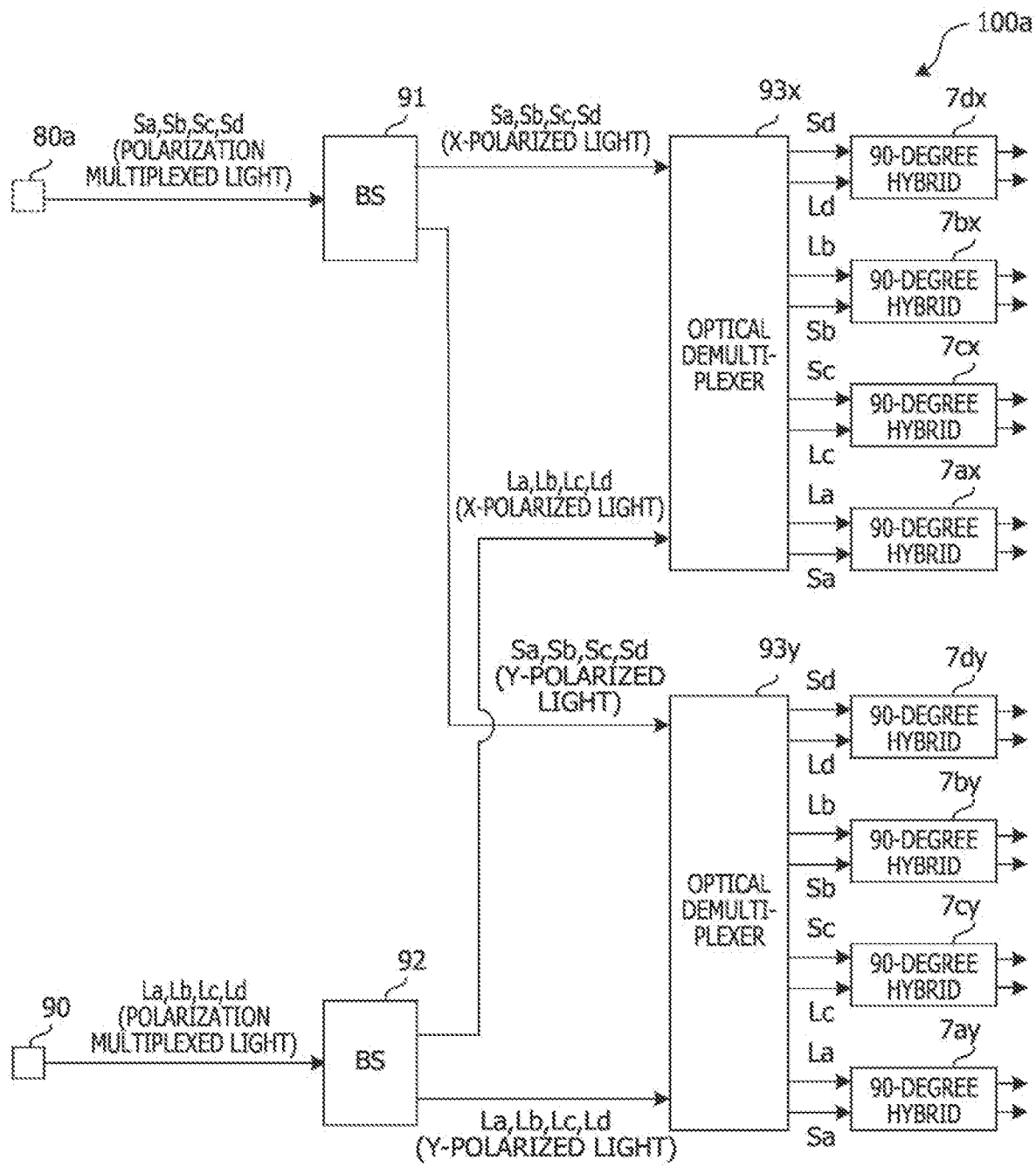
FIG. 20 is a configuration diagram illustrating an example of a communication device that receives signal light and local oscillation light of polarization multiplexed light.

FIG. 20 is a configuration diagram illustrating an example of a communication device 100a that receives signal lights Sa to Sd and local oscillation lights La to Ld of polarization multiplexed light. A transmitting-side communication device 80a transmits the polarization multiplexed light containing an X-polarized light and a Y-polarized light of the signal lights Sa to Sd to the communication device 100a through a transmission path such as an optical fiber.

The communication device 100a includes beam splitters (BS) 91 and 92 that split light for each polarization, optical demultiplexers 93x and 93y, and 90-degree hybrid circuits 7ax to 7dx and 7ay to 7dy. The polarization multiplexed light containing the signal lights Sa to Sd is inputted to the BS91 and demultiplexed into the signal lights Sa to Sd of the X-polarized light and the signal lights Sa to Sd of the Y-polarized light. The signal lights Sa to Sd of the X-polarized light are inputted to the optical demultiplexer 93x, and the signal lights Sa to Sd of the Y-polarized light are inputted to the optical demultiplexer 93y.

The light source 90 outputs polarization multiplexed light of the local oscillation lights La to Ld to the BS92. The polarization multiplexed light of the local oscillation lights La to Ld is inputted to the BS92 and demultiplexed into the local oscillation lights La to Ld of the X-polarized light and the local oscillation lights La to Ld of the Y-polarized light. The local oscillation lights La to Ld of the X-polarized light are inputted to the optical demultiplexer 93x, and the local oscillation lights La to Ld of the Y-polarized light are inputted to the optical demultiplexer 93y.

The optical demultiplexers 93x and 93y have the same configuration as that of the four-wavelength optical demultiplexer 1, 1x to 1z, and 2 described above. The optical demultiplexer 93x demultiplexes the signal lights Sa to Sd and the local oscillation lights La to Ld of the X-polarized light for each wavelength. The signal lights Sa to Sd and the local oscillation lights La to Ld having the same center wavelength are inputted to the 90-degree hybrid circuits 7ax to 7dx. The 90-degree hybrid circuits 7ax to 7dx detect the signal lights Sa to Sd by means of the local oscillation lights La to Ld.

The optical demultiplexer 93y demultiplexes the signal lights Sa to Sd and the local oscillation lights La to Ld of the Y-polarized light for each wavelength. The signal lights Sa to Sd and the local oscillation lights La to Ld having the same center wavelength are inputted to the 90-degree hybrid circuits 7ay to 7dy. The 90-degree hybrid circuits 7ay to 7dy detect the signal lights Sa to Sd by means of the local oscillation lights La to Ld.

As described above, since the communication device 100a may receive the polarization-multiplexed signal lights Sa to Sd, the transmission capacity may be increased as compared with the communication device 100 of FIG. 3.

Example of Other Signal Light

Figure 21:
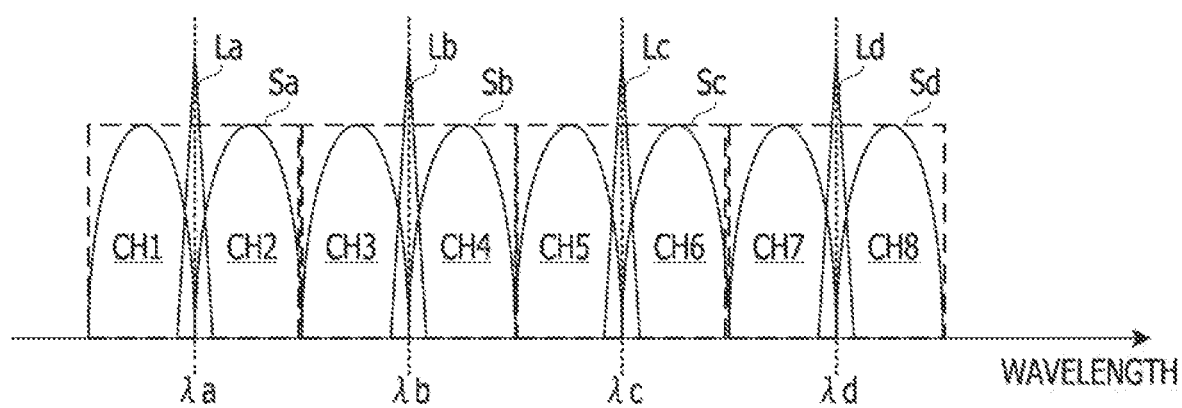
FIG. 21 is a diagram illustrating an example of spectra of other signal light and local oscillation light.

FIG. 21 is a diagram illustrating an example of the spectra of other signal lights Sa to Sd and local oscillation lights La to Ld. The signal lights Sa to Sd contain signal data of two channels CH1 to CH8, instead of one channel. The signal light Sa contains channels CH1 and CH2, and the signal light Sb contains channels CH3 and CH4. The signal light Sc contains channels CH5 and CH6, and the signal light Sd contains channels CH7 and CH8.

The center wavelength λa of the local oscillation light La is located at the center of the center wavelength of the channels CH1 and CH2, and the center wavelength λb of the local oscillation light Lb is located at the center of the center wavelength of the channels CH3 and CH4. The center wavelength λc of the local oscillation light Lc is located at the center of the center wavelength of the channels CH5 and CH6, and the center wavelength λd of the local oscillation light Ld is located at the center of the center wavelength of the channels CH7 and CH8.

In the case of the signal format of this example, again, the optical demultiplexers 1, 1x to 1z, and 2 may also demultiplex the signal lights Sa to Sd and the local oscillation lights La to Ld for each center wavelength λa to λd.

The above-described embodiments are an example of a preferred embodiment of the present disclosure. However, the embodiments are not limited to those described above and various modifications may be made within a scope not departing from the gist of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical demultiplexer comprising:
a first optical processing circuit configured to receive multi-wavelength signal light including a plurality of signal light components and multi-wavelength local oscillation light including a plurality of local oscillation lights with same center wavelengths as the plurality of signal light components, respectively;
a second optical processing circuit configured to demultiplex a signal light component and a local oscillation light inputted from the first optical processing circuit among the plurality of signal light components and the plurality of local oscillation lights; and
a third optical processing circuit configured to demultiplex another signal light component and another local oscillation light inputted from the first optical processing circuit among the plurality of signal light components and the plurality of local oscillation lights,
wherein the first optical processing circuit includes first to third asymmetric Mach-Zehnder interferometers, each including a pair of arms of different lengths,
wherein the first asymmetric Mach-Zehnder interferometer outputs, to the second asymmetric Mach-Zehnder interferometer, a first signal light component and a first local oscillation light with center wavelengths adjacent to each other among the plurality of signal light components and the plurality of local oscillation lights inputted to the pair of arms, and outputs, to the third asymmetric Mach-Zehnder interferometer, a second signal light component with the same center wavelength as the first local oscillation light and a second local oscillation light with the same center wavelength as the first signal light component,
wherein the second asymmetric Mach-Zehnder interferometer outputs the first signal light component and the first local oscillation light, which are inputted to the pair of arms from the first asymmetric Mach-Zehnder interferometer, to the second optical processing circuit and the third optical processing circuit, respectively, and
wherein the third asymmetric Mach-Zehnder interferometer outputs the second local oscillation light and the second signal light component, which are inputted to the pair of arms from the first asymmetric Mach-Zehnder interferometer, to the second optical processing circuit and the third optical processing circuit, respectively.

2. The optical demultiplexer according to claim 1,
wherein the second optical processing circuit demultiplexes the first signal light component and the second local oscillation light, and outputs the demultiplexed first signal light component and second local oscillation light to a first detection circuit that detects the first signal light component by means of the second local oscillation light, and
wherein the third optical processing circuit demultiplexes the second signal light component and the first local oscillation light, and outputs the demultiplexed second signal light component and first local oscillation light to a second detection circuit that detects the second signal light component by means of the first local oscillation light.

3. The optical demultiplexer according to claim 1,
wherein the first asymmetric Mach-Zehnder interferometer is provided with a first phase shifter that adjusts optical phases in the pair of arms, respectively, and
wherein the first optical processing circuit includes
a first monitor that monitors a power of the first signal light component outputted from the second asymmetric Mach-Zehnder interferometer to the second optical processing circuit,
a second monitor that monitors a power of the second signal light component outputted from the third asymmetric Mach-Zehnder interferometer to the third optical processing circuit, and a first phase control circuit that controls an adjustment amount of the optical phase with respect to the first phase shifter according to each monitoring result on the power of the first signal light component and the power of the second signal light component.

4. The optical demultiplexer according to claim 1,
wherein the second asymmetric Mach-Zehnder interferometer is provided with a second phase shifter that adjusts optical phases in the pair of arms, respectively, and
wherein the first optical processing circuit includes
a third monitor that monitors a power of the first local oscillation light outputted from the second asymmetric Mach-Zehnder interferometer to the third optical processing circuit, and
a second phase control circuit that controls an adjustment amount of the optical phase with respect to the second phase shifter according to a monitoring result on the power of the first local oscillation light.

5. The optical demultiplexer according to claim 1,
wherein the third asymmetric Mach-Zehnder interferometer is provided with a third phase shifter that adjusts optical phases in the pair of arms, respectively, and
wherein the first optical processing circuit includes
a fourth monitor that monitors a power of the second local oscillation light outputted from the third asymmetric Mach-Zehnder interferometer to the second optical processing circuit, and
a third phase control circuit that controls an adjustment amount of the optical phase with respect to the third phase shifter according to a monitoring result on the power of the second local oscillation light.

6. The optical demultiplexer according to claim 1,
wherein the first to third asymmetric Mach-Zehnder interferometers are provided with first to third phase shifters that adjust optical phases in the pair of arms, respectively, and
wherein the first optical processing circuit includes
a fifth monitor that monitors the power of the first local oscillation light outputted from the second asymmetric Mach-Zehnder interferometer to the third optical processing circuit,
a sixth monitor that monitors the power of the second local oscillation light outputted from the third asymmetric Mach-Zehnder interferometer to the second optical processing circuit,
a fourth phase control circuit that controls the adjustment amount of the optical phase with respect to the second phase shifter according to the monitoring result on the power of the first local oscillation light,
a fifth phase control circuit that controls the adjustment amount of the optical phase with respect to the third phase shifter according to the monitoring result on the power of the second local oscillation light, and
a sixth phase control circuit that controls the adjustment amount of the optical phase with respect to the first phase shifter according to each of the monitoring results on the power of the first local oscillation light and the power of the second local oscillation light.

7. The optical demultiplexer according to claim 1,
wherein the first to third asymmetric Mach-Zehnder interferometers are provided with first to third phase shifters that adjust optical phases in the pair of arms, respectively, and
wherein the first optical processing circuit includes
a seventh monitoring circuit that monitors the power of the first signal light component outputted from the second asymmetric Mach-Zehnder interferometer to the second optical processing circuit,
an eighth monitor that monitors the power of the second signal light component outputted from the third asymmetric Mach-Zehnder interferometer to the third optical processing circuit,
a seventh phase control circuit that controls the adjustment amount of the optical phase with respect to the second phase shifter according to the monitoring result on the power of the first signal light component,
an eighth phase control circuit that controls the adjustment amount of the optical phase with respect to the third phase shifter according to the monitoring result on the power of the second signal light component, and
a ninth phase control circuit that controls the adjustment amount of the optical phase with respect to the first phase shifter according to each of the monitoring results on the power of the first signal light component and the power of the second signal light component.

8. The optical demultiplexer according to claim 1, further comprising:
a shaping circuit that shapes spectra of the signal light component and local oscillation light outputted from the first asymmetric Mach-Zehnder interferometer, the second asymmetric Mach-Zehnder interferometer, or the third asymmetric Mach-Zehnder interferometer, among the plurality of signal light components and the plurality of local oscillation lights.

9. The optical demultiplexer according to claim 1,
wherein, in a case where a number of wavelengths of the plurality of signal components and the plurality of local oscillation lights is $2^N$, the second and third optical processing circuits include a plurality of sets of the first to third asymmetric Mach-Zehnder interferometers coupled across (N−1) stages, wherein the N is an integer of 3 or more.

10. A communication device comprising:
an optical demultiplexer configured to include
a first optical processing circuit that receives multi-wavelength signal light including a plurality of signal light components and multi-wavelength local oscillation light including a plurality of local oscillation lights with same center wavelengths as the plurality of signal light components, respectively,
a second optical processing circuit that demultiplexes a signal light component and a local oscillation light inputted from the first optical processing circuit among the plurality of signal light components and the plurality of local oscillation lights, and
a third optical processing circuit that demultiplexes another signal light component and another local oscillation light inputted from the first optical processing circuit among the plurality of signal light components and the plurality of local oscillation lights,
wherein the first optical processing circuit includes first to third asymmetric Mach-Zehnder interferometers, each including a pair of arms of different lengths,
wherein the first asymmetric Mach-Zehnder interferometer outputs, to the second asymmetric Mach-Zehnder interferometer, a first signal light component and a first local oscillation light with center wavelengths adjacent to each other among the plurality of signal light components and the plurality of local oscillation lights inputted to the pair of arms, and outputs, to the third asymmetric Mach-Zehnder interferometer, a second signal light component with the same center wavelength as the first local oscillation light and a second local oscillation light with the same center wavelength as the first signal light component, wherein the second asymmetric Mach-Zehnder interferometer outputs the first signal light component and the first local oscillation light, which are inputted to the pair of arms from the first asymmetric Mach-Zehnder interferometer, to the second optical processing circuit and the third optical processing circuit, respectively, and wherein the third asymmetric Mach-Zehnder interferometer outputs the second local oscillation light and the second signal light component, which are inputted to the pair of arms from the first asymmetric Mach-Zehnder interferometer, to the second optical processing circuit and the third optical processing circuit, respectively;

a first detection circuit configured to detect the first signal light component based on the second local oscillation light; and a second detection circuit configured to detect the second signal light component based on the first local oscillation light, wherein the second optical processing circuit demultiplexes the first signal light component and the second local oscillation light and outputs the demultiplexed lights to the first detection circuit, and wherein the third optical processing circuit demultiplexes the second signal light component and the first local oscillation light and outputs the demultiplexed lights to the second detection circuit.

11. The communication device according to claim 10, further comprising:

a light source configured to output the multi-wavelength local oscillation light to the optical demultiplexer; and a wavelength control circuit configured to control each of the center wavelengths of the plurality of local oscillation lights with respect to the light source according to the detection results from the first detection circuit and the second detection circuit.

12. The communication device according to claim 10, wherein the second optical processing circuit demultiplexes the first signal light component and the second local oscillation light, and outputs the demultiplexed first signal light component and second local oscillation light to a first detection circuit that detects the first signal light component by means of the second local oscillation light, and wherein the third optical processing circuit demultiplexes the second signal light component and the first local oscillation light, and outputs the demultiplexed second signal light component and first local oscillation light to a second detection circuit that detects the second signal light component by means of the first local oscillation light.

13. The communication device according to claim 10, wherein the first asymmetric Mach-Zehnder interferometer is provided with a first phase shifter that adjusts optical phases in the pair of arms, respectively, and wherein the first optical processing circuit includes a first monitor that monitors a power of the first signal light component outputted from the second asymmetric Mach-Zehnder interferometer to the second optical processing circuit, a second monitor that monitors a power of the second signal light component outputted from the third asymmetric Mach-Zehnder interferometer to the third optical processing circuit, and a first phase control circuit that controls an adjustment amount of the optical phase with respect to the first phase shifter according to each monitoring result of the power on the first signal light component and the power of the second signal light component.

14. The communication device according to claim 10, wherein the second asymmetric Mach-Zehnder interferometer is provided with a second phase shifter that adjusts optical phases in the pair of arms, respectively, and wherein the first optical processing circuit includes a third monitor that monitors a power of the first local oscillation light outputted from the second asymmetric Mach-Zehnder interferometer to the third optical processing circuit, and a second phase control circuit that controls an adjustment amount of the optical phase with respect to the second phase shifter according to a monitoring result on the power of the first local oscillation light.

15. The communication device according to claim 10, wherein the third asymmetric Mach-Zehnder interferometer is provided with a third phase shifter that adjusts optical phases in the pair of arms, respectively, and wherein the first optical processing circuit includes a fourth monitor that monitors a power of the second local oscillation light outputted from the third asymmetric Mach-Zehnder interferometer to the second optical processing circuit, and a third phase control circuit that controls an adjustment amount of the optical phase with respect to the third phase shifter according to a monitoring result of the power on the second local oscillation light.

16. The communication device according to claim 10, wherein the first to third asymmetric Mach-Zehnder interferometers are provided with first to third phase shifters that adjust optical phases in the pair of arms, respectively, and wherein the first optical processing circuit includes a fifth monitor that monitors the power of the first local oscillation light outputted from the second asymmetric Mach-Zehnder interferometer to the third optical processing circuit, a sixth monitor that monitors the power of the second local oscillation light outputted from the third asymmetric Mach-Zehnder interferometer to the second optical processing circuit, a fourth phase control circuit that controls the adjustment amount of the optical phase with respect to the second phase shifter according to the monitoring result on the power of the first local oscillation light, a fifth phase control circuit that controls the adjustment amount of the optical phase with respect to the third phase shifter according to the monitoring result on the power of the second local oscillation light, and a sixth phase control circuit that controls the adjustment amount of the optical phase with respect to the first phase shifter according to each of the monitoring results on the power of the first local oscillation light and the power of the second local oscillation light.

17. The communication device according to claim 10, wherein the first to third asymmetric Mach-Zehnder interferometers are provided with first to third phase shifters that adjust optical phases in the pair of arms, respectively, and wherein the first optical processing circuit includes a seventh monitoring circuit that monitors the power of the first signal light component outputted from the second asymmetric Mach-Zehnder interferometer to the second optical processing circuit, an eighth monitor that monitors the power of the second signal light component outputted from the third asymmetric Mach-Zehnder interferometer to the third optical processing circuit, a seventh phase control circuit that controls the adjustment amount of the optical phase with respect to the second phase shifter according to the monitoring result on the power of the first signal light component, an eighth phase control circuit that controls the adjustment amount of the optical phase with respect to the third phase shifter according to the monitoring result on the power of the second signal light component, and a ninth phase control circuit that controls the adjustment amount of the optical phase with respect to the first phase shifter according to each of the monitoring results on the power of the first signal light component and the power of the second signal light component.

18. The communication device according to claim 10, the optical demultiplexer further includes a shaping circuit that shapes spectra of the signal light component and local oscillation light outputted from the first asymmetric Mach-Zehnder interferometer, the second asymmetric Mach-Zehnder interferometer, or the third asymmetric Mach-Zehnder interferometer, among the plurality of signal light components and the plurality of local oscillation lights.

19. The communication device according to claim 10, wherein, in a case where a number of wavelengths of the plurality of signal components and the plurality of local oscillation lights is $2^N$, the second and third optical processing circuits include a plurality of sets of the first to third asymmetric Mach-Zehnder interferometers coupled across (N−1) stages, wherein the N is an integer of 3 or more.

* * * * *